(12) United States Patent
Kim et al.

(10) Patent No.: US 11,003,266 B2
(45) Date of Patent: May 11, 2021

(54) DISPLAY DEVICE

(71) Applicant: SAMSUNG DISPLAY CO., LTD., Yongin-si (KR)

(72) Inventors: Sunghwan Kim, Yongin-si (KR); Gwangbum Ko, Suwon-si (KR); Gayoung Kim, Hwaseong-si (KR); Doik Kim, Suwon-si (KR); Junghak Kim, Hwaseong-si (KR); Yeonsung Jung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 148 days.

(21) Appl. No.: 16/131,323

(22) Filed: Sep. 14, 2018

(65) Prior Publication Data
US 2019/0220121 A1     Jul. 18, 2019

(30) Foreign Application Priority Data

Jan. 17, 2018  (KR) ........................ 10-2018-0006149

(51) Int. Cl.
*G06F 3/041*       (2006.01)
*H01L 51/50*       (2006.01)
(Continued)

(52) U.S. Cl.
CPC ............ *G06F 3/0412* (2013.01); *G06F 21/32* (2013.01); *G06K 9/0004* (2013.01);
(Continued)

(58) Field of Classification Search
CPC ..... G06F 3/0412; G06F 21/32; G06K 9/2036; G06K 9/00006; G06K 9/0004;
(Continued)

(56) References Cited

U.S. PATENT DOCUMENTS

| 9,864,893 B2 | 1/2018 | Kim et al. |
| 2004/0027339 A1* | 2/2004 | Schulz ................ C03C 17/3417 345/173 |

(Continued)

FOREIGN PATENT DOCUMENTS

| KR | 10-1376227 | 3/2014 |
| KR | 10-2016-0029735 | 3/2016 |

(Continued)

OTHER PUBLICATIONS

European Search Report issued in corresponding European Patent Application No. 18213358.7 dated Jun. 26, 2019.

*Primary Examiner* — Alexander Eisen
*Assistant Examiner* — Kebede T Teshome
(74) *Attorney, Agent, or Firm* — F. Chau & Associates, LLC

(57) ABSTRACT

A display device including: an optical image sensor; a pinhole array mask layer on the optical image sensor; a display layer disposed on the pinhole array mask layer and including a plurality of pixels; and a transparent cover layer disposed on the display layer, wherein a finger placement surface is provided on the transparent cover layer, wherein each of the pixels is one of a red pixel, a green pixel, and a blue pixel, and at least one of the green pixel and the blue pixel emits light and the red pixel does not emit light when a finger is adjacent to the finger placement surface.

32 Claims, 25 Drawing Sheets

(51) Int. Cl.
*H01L 27/12* (2006.01)
*H01L 27/32* (2006.01)
*G06K 9/00* (2006.01)
*G06F 21/32* (2013.01)
*H01L 27/146* (2006.01)
*H01L 51/52* (2006.01)
*G06K 9/20* (2006.01)

(52) U.S. Cl.
CPC ..... *G06K 9/00006* (2013.01); *G06K 9/00087* (2013.01); *G06K 9/2036* (2013.01); *H01L 27/124* (2013.01); *H01L 27/14621* (2013.01); *H01L 27/323* (2013.01); *H01L 51/5012* (2013.01); *H01L 51/5281* (2013.01); *H01L 27/3234* (2013.01)

(58) Field of Classification Search
CPC ............ G06K 9/00087; H01L 51/5281; H01L 51/5012; H01L 27/14621; H01L 27/323; H01L 27/124; H01L 27/3234; H01L 27/3244; H01L 27/3225
See application file for complete search history.

(56) References Cited

U.S. PATENT DOCUMENTS

| | | | |
|---|---|---|---|
| 2014/0354597 A1* | 12/2014 | Kitchens, II | G06F 1/3215 345/175 |
| 2015/0324570 A1* | 11/2015 | Lee | G06K 9/3208 382/124 |
| 2016/0202812 A1* | 7/2016 | Pyoun | G06F 3/0412 345/173 |
| 2016/0266695 A1* | 9/2016 | Bae | G06K 9/00053 |
| 2017/0017824 A1 | 1/2017 | Smith et al. | |
| 2018/0012069 A1 | 1/2018 | Chung et al. | |
| 2018/0027157 A1 | 1/2018 | Masuda et al. | |
| 2018/0040675 A1* | 2/2018 | Zeng | G06K 9/0004 |
| 2018/0046837 A1 | 2/2018 | Gozzini et al. | |
| 2018/0225498 A1* | 8/2018 | Setlak | G06K 9/00026 |
| 2019/0114460 A1* | 4/2019 | Zhu | G06K 9/00013 |

FOREIGN PATENT DOCUMENTS

| | | |
|---|---|---|
| KR | 10-2016-0048643 | 5/2016 |
| KR | 10-1674555 | 11/2016 |
| KR | 10-2017-0109651 | 9/2017 |
| WO | 2017/204777 | 11/2017 |

* cited by examiner

DISPLAY DEVICE

CROSS-REFERENCE TO RELATED APPLICATION

This application claims priority under 35 U.S.C. § 119 to Korean Patent Application No. 10-2018-0006149, filed on Jan. 17, 2018, in the Korean Intellectual Property Office (KIPO), the disclosure of which is incorporated by reference herein in its entirety.

TECHNICAL FIELD

Exemplary embodiments of the present invention relate to a display device, and more particularly, to a display device including an optical image sensor.

DISCUSSION OF RELATED ART

Biometric authentication is widely used in display devices such as mobile terminals. Fingerprint detection and matching is one example of biometric authentication employed by mobile terminals.

However, a fingerprint recognition area of a fingerprint recognition device may overlap a display area of a display device.

SUMMARY

According to an exemplary embodiment of the present invention, a display device includes; an optical image sensor; a pinhole array mask layer on the optical image sensor; a display layer disposed on the pinhole array mask layer and including a plurality of pixels; and a transparent cover layer disposed on the display layer, wherein a finger placement surface is provided on the transparent cover layer. Each of the pixels is one of a red pixel, a green pixel, and a blue pixel, and at least one of the green pixel and the blue pixel emits light and the red pixel does not emit light when a finger is adjacent to the finger placement surface.

The display layer may display a fingerprint recognition area overlapping the optical image sensor.

Only the red pixel that is located in an area of the finger placement surface that is in contact with the finger may not emit light.

At least one of the green pixel and the blue pixel that is located in the area of the finger placement surface that is in contact with the finger may emit light.

The display layer may further include a touch sensing layer for sensing a shape of the finger in contact with the finger placement surface.

A width of a pinhole of the pinhole array mask layer may be about 20 µm to about 80 µm.

A width of a pinhole of the pinhole array mask layer may be about 65 µm or more when a distance between the pinhole array mask layer and the optical image sensor is about 3.0 mm or more and about 4.0 mm or less, the width of the pinhole may be about 45 µm to about 75 µm when the distance between the pinhole array mask layer and the optical image sensor is about 2.0 mm or more and about 3.0 mm or less, the width of the pinhole may be about 25 µm to about 55 µm when the distance between the pinhole array mask layer and the optical image sensor is about 1.0 mm or more and about 2.0 mm or less, and the width of the pinhole may be about 25 µm to about 55 µm when the distance between the pinhole array mask layer and the optical image sensor is about 0.5 mm or more and about 1.0 mm or less.

According to an exemplary embodiment of the present invention, a display device includes: an optical image sensor; a pinhole array mask layer disposed on the optical image sensor and including a plurality of pinholes; a display layer disposed on the pinhole array mask layer and including a plurality of pixels; and a transparent cover layer disposed on the display layer and having a finger placement surface. Adjacent pinholes of the plurality of pinholes are spaced apart from each other by a distance of about 40 µm to about 127 µm.

The adjacent pinholes are spaced apart from each other by the distance of about 40 µm to about 85 µm.

The pinhole array mask layer may be spaced from the optical image sensor by a distance of about 0.25 mm to about 4.0 mm.

A minimum value of the distance between the adjacent pinholes may be about 80 µm when the distance between the pinhole array mask layer and the optical image sensor is about 3.0 mm or more and about 4.0 mm or less, the minimum value of the distance between the adjacent pinholes may be about 70 µm when the distance between the pinhole array mask layer and the optical image sensor is about 2.0 mm or more and about 3.0 mm or less, the minimum value of the distance between the adjacent pinholes may be about 55 µm when the distance between the pinhole array mask layer and the optical image sensor is about 1.0 mm or more and about 2.0 mm or less, the minimum value of the distance between the adjacent pinholes may be about 45 µm when the distance between the pinhole array mask layer and the optical image sensor is about 0.5 mm or more and about 1.0 mm or less, and the minimum value of the distance between the adjacent pinholes may be about 40 µm when the distance between the pinhole array mask layer and the optical image sensor is about 0.25 mm or more and about 0.5 mm or less.

The pinhole array mask layer may be spaced apart from the optical image sensor by about 1 mm or less.

A width of a first pinhole of the plurality of pinholes may be about 20 µm to about 80 µm.

A width of the first pinhole may be about 65 µm or more when a distance between the pinhole array mask layer and the optical image sensor is about 3.0 mm or more and about 4.0 mm or less, the width of the first pinhole may be about 45 µm to about 75 µm when the distance between the pinhole array mask layer and the optical image sensor is about 2.0 mm or more and about 3.0 mm or less, the width of the first pinhole may be about 25 µm to about 55 µm when the distance between the pinhole array mask layer and the optical image sensor is about 1.0 mm or more and about 2.0 mm or less, and the width of the first pinhole may be about 25 µm to about 55 µm when the distance between the pinhole array mask layer and the optical image sensor is about 0.5 mm or more and about 1.0 mm or less.

A ratio of a thickness of the pinhole array mask layer to a width of a first pinhole of the plurality of pinholes may be about 5 to about 20.

According to an exemplary embodiment of the present invention, a display device includes: an optical image sensor; a pinhole array mask layer on the optical image sensor; a display layer disposed on the pinhole array mask layer and including a plurality of pixels; a transparent cover layer disposed on the display layer and having a finger placement surface; and an anti-reflection layer between the display layer and the pinhole array mask layer.

The anti-reflection layer may include a polarizing layer.
The anti-reflection layer may include a retardation layer.
The retardation layer may be a quarter retardation layer.

The anti-reflection layer may include a matte film.

The anti-reflection layer may include a matte-treated surface of the display layer.

The anti-reflection layer may include a matte-treated surface of the pinhole array mask layer.

An inner circumferential surface of the pinhole may be matte-treated.

The optical image sensor may further include a filter for blocking red light.

The filter may be a color filter that transmits green or blue light.

The optical image sensor may further include a filter for blocking infrared rays.

According to an exemplary embodiment of the present invention, a display device includes: an optical image sensor including a plurality of sensing elements having a first pattern; a pinhole array mask layer disposed on the optical image sensor and including a plurality of pinholes having a second pattern; a display layer disposed on the pinhole array mask layer and including a plurality of pixels having a third pattern; and a transparent cover layer disposed on the display layer and having a finger placement surface. The first pattern and the second pattern are not parallel to each other.

Each of the first pattern and the second pattern may be in the form of a matrix having rows and columns, and the rows and the columns of the first pattern may not be parallel to the rows and the columns of the second pattern.

An angle between the rows of the first pattern and the rows of the second pattern may be greater than about 0 degree and less than about 45 degrees.

The angle between the rows of the first pattern and the rows of the second pattern may be greater than about 15 degrees and less than about 30 degrees.

The second pattern and the third pattern may not be parallel to each other.

The third pattern may be in the form of a matrix having rows and columns, and the rows and the columns of the third pattern may not be parallel to the rows and the columns of the second pattern.

The first pattern, the second pattern, and the third pattern may not be parallel to each other.

According to an exemplary embodiment of the present invention, a display device includes: an optical image sensor including a plurality of sensing elements, wherein "n" of the sensing elements are arranged per predetermined length in a first direction; a pinhole array mask layer disposed on the optical image sensor and including a plurality of pinholes, wherein "m" of the pinholes are arranged per the predetermined length in the first direction; a display layer disposed on the pinhole array mask layer and including a plurality of pixels; and a transparent cover layer disposed on the display layer and having a finger placement surface, wherein n and m are natural numbers that are prime to each other. The predetermined length may be substantially equal to or larger than a length of the optical image sensor in the first direction.

The predetermined length may be at least two times or more of the length of the optical image sensor in the first direction.

BRIEF DESCRIPTION OF THE DRAWINGS

The above and other features of the present invention will become more apparent by describing in detail exemplary embodiments thereof with reference to the accompanying drawings, wherein.

DETAILED DESCRIPTION OF THE EMBODIMENTS

Figure 1:
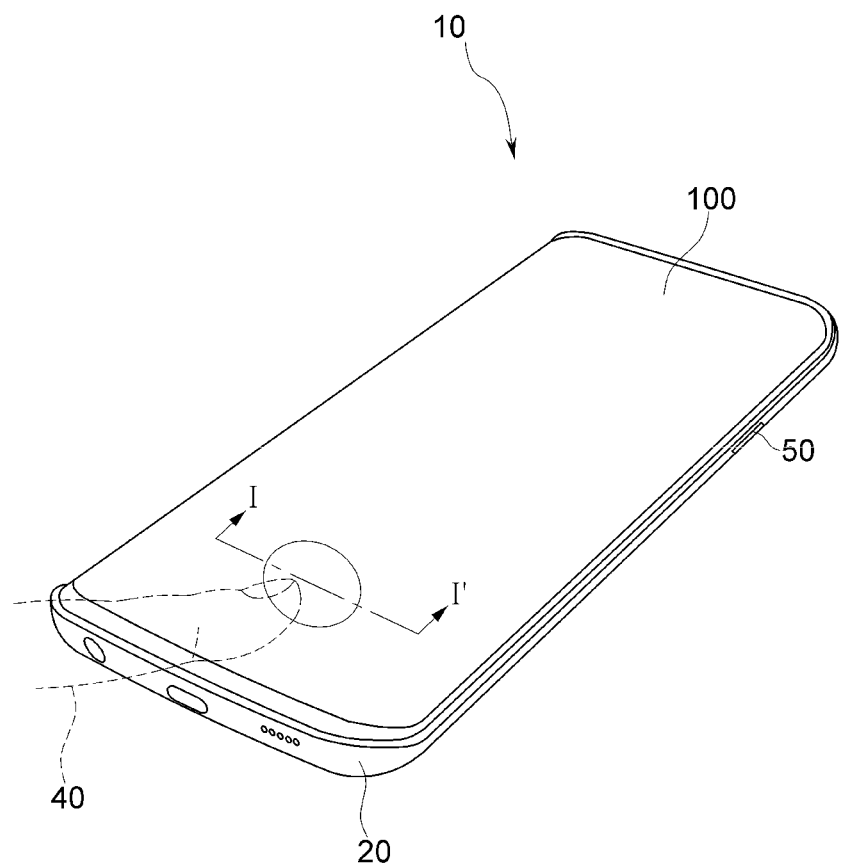
FIG. 1 is a perspective view illustrating a display device according to an exemplary embodiment of the present invention.

Exemplary embodiments of the present invention will now be described more fully hereinafter with reference to the accompanying drawings. The present invention may, however, be embodied in many different forms and should not be construed as being limited to the exemplary embodiments set forth herein.

In the drawings, thicknesses of a plurality of layers and areas may be illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. In the drawings, like reference numerals may refer to like elements.

Throughout the specification, when an element is referred to as being "connected" to another element, the element may be "directly connected" to the other element, or "electrically connected" to the other element with one or more intervening elements interposed therebetween.

"About" or "approximately" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within ±30%, 20%, 10%, 5% of the stated value.

Hereinafter, an exemplary embodiment of the present invention will be described with reference to FIGS. 1 to 20B.

Figure 2:
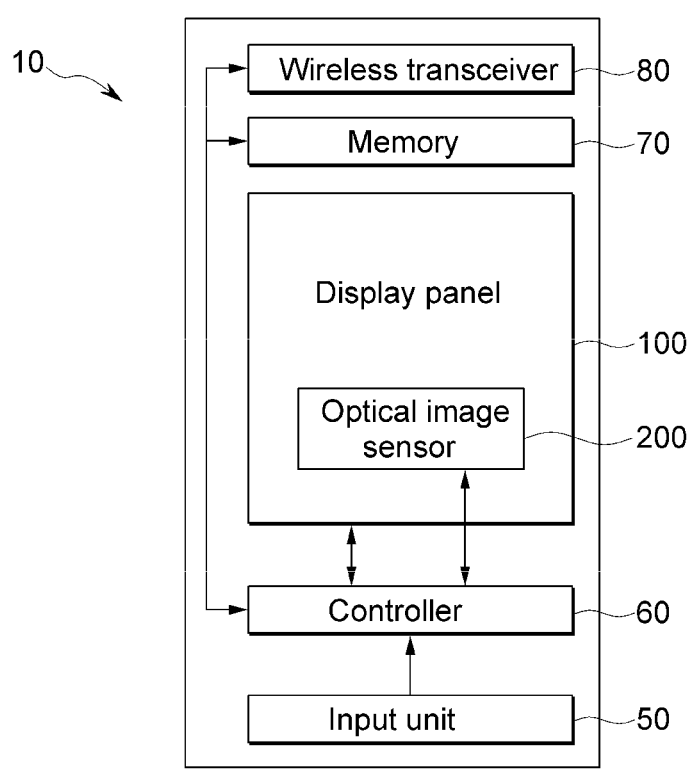
FIG. 2 is a block diagram illustrating a display device according to an exemplary embodiment of the present invention.

FIG. 1 is a perspective view illustrating a display device 10 according to an exemplary embodiment of the present invention, and FIG. 2 is a block diagram illustrating the display device 10 according to an exemplary embodiment of the present invention.

Referring to FIGS. 1 and 2, the display device 10 includes a housing 20 such as a portable housing, and a controller 60 in the housing 20. The display device 10 may be a mobile wireless communication device, for example, a cellular telephone. The display device 10 may be another type of electronic device, for example, a tablet computer, a laptop computer, a wearable computer, or the like.

A wireless transceiver 80 is also included in the housing 20 and coupled to the controller 60. The wireless transceiver 80 cooperates with the controller 60 to perform at least one wireless communication function, for example, voice and/or data. In exemplary embodiments of the present invention, the display device 10 may not include the wireless transceiver 80 or other wireless communication circuitry.

A display panel 100 (which may be also referred to as a display layer or a display area) is included in the housing 20 and coupled to the controller 60. The display panel 100 may be, for example, a light emitting diode (LED) display panel. The display panel 100 may include additional circuitry to provide a touch display function.

A memory 70 is included in the housing 40 and coupled to the controller 60. The memory 70 stores, for example, finger-matching biometric to plate data. The memory 70 may store other or additional types of data.

The display panel 100 is in the form of a touch display, and the touch display serves as both an input device and a display, in addition, the display panel 100 may perform one or more functions in cooperation with the controller 60 in response to an input. For example, the display panel 100 may perform a menu function based on the power on or off of the display device 10, the start of communication through the wireless transceiver 80, and/or the input to the touch display.

For example, with respect to the menu function, the controller 60 may display a menu of available applications on the display panel 100 based on an input or a tap to the touch display. In addition, an input unit 50, such as a push button switch, may be included in the housing 20.

Figure 3A:
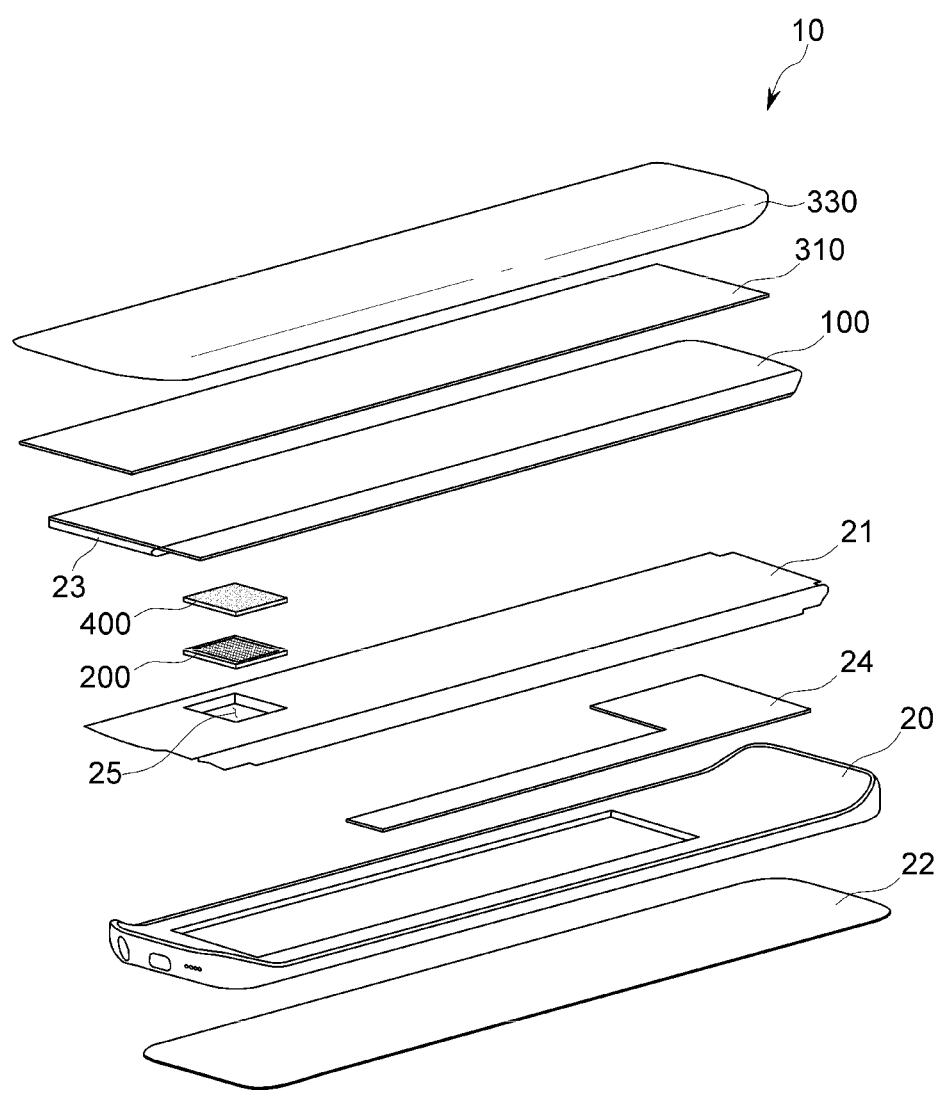
FIG. 3A is an exploded perspective view schematically illustrating the display device of FIG. 1, according to an exemplary embodiment of the present invention.
Figure 3B:
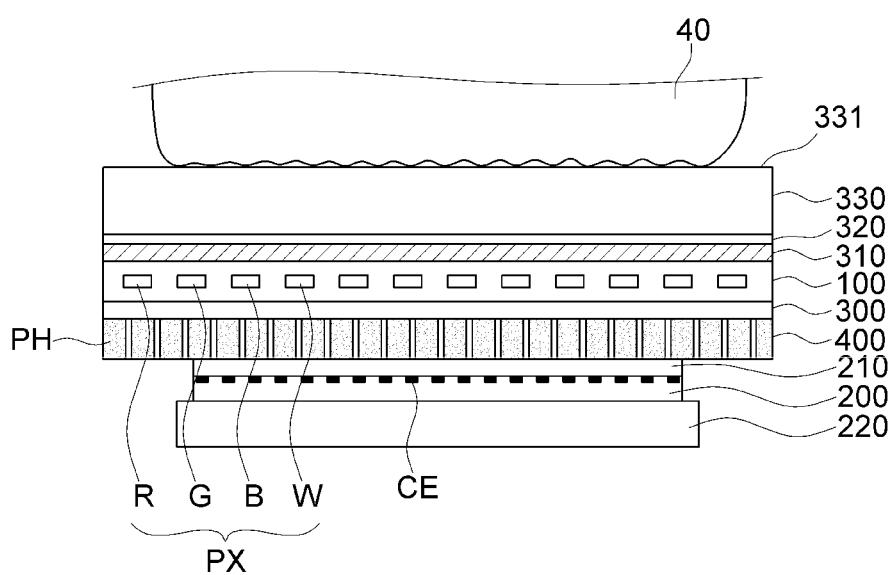
FIG. 3B is a cross-sectional view taken along line I-I' of FIG. 1, according to an exemplary embodiment of the present invention.

FIG. 3A is an exploded perspective view schematically illustrating the display device of FIG. 1, according to an exemplary embodiment of the present invention, and FIG. 3B is a cross-sectional view taken along line I-I' of FIG. 1, according to an exemplary embodiment of the present invention. The display device 10 will be described in more detail with reference to FIGS. 3A and 3B.

Referring to FIG. 3A, the display device 10 includes a transparent cover layer 330, a touch sensing layer 310, a display panel 100, a pinhole array mask layer 400, an optical image sensor 200, a bracket 21, a printed circuit board 24, a housing 20, and a back surface cover 22. According to an exemplary embodiment of the present invention, the components of the display device 10 may be stacked in close contact with each other or partially spaced apart from each other.

The transparent cover layer 330 may form an exterior appearance of a front surface of the display device 10 to define a finger placement surface 331 capable of accommodating an adjacent finger 40. According to an exemplary embodiment of the present inventive concept, the transparent cover layer 330 may include a transparent material such as glass so that contents output through the display panel 100 may be exposed to the outside. According to exemplary embodiments of the present invention, a part of a rim portion of a front cover 110 may be curved backwards from the finger placement surface 331 to form a curved surface. It is illustrated in FIG. 3A that a side surface area of the transparent cover layer 330 forms a curved surface.

The display panel 100 is disposed below the transparent cover layer 330, and may display various contents. The display panel 100 may include a substrate, a plurality of pixels PX disposed on one surface of the substrate, and at least one conductive line electrically connected to the pixels PX. The substrate may include a flexible material so that at least a part (for example, a bending portion 23) of the substrate may be bent in the direction of a back surface of the substrate. The conductive line may include at least one gate line or at least one data line. According to an exemplary embodiment of the present invention, the plurality of gate lines and the plurality of data lines may be arranged in a matrix, and the plurality of pixels PX may be aligned near points where the gate and data lines intersect each other to be electrically connected thereto.

According to exemplary embodiments of the present invention, the display panel 100 may be connected to a drive circuit (or display drive circuit). According to an exemplary embodiment of the present invention, the display drive circuit may be connected to the bending portion 23 of the display panel 100. The display drive circuit may be electrically connected to the conductive line. The display drive circuit may include a driver integrated circuit ("IC") for providing a driving signal and an image signal to the display panel 100 or a timing controller ("T-con") for controlling the driving signal and the image signal. The driver IC may include a gate driver IC for sequentially selecting gate lines of the display panel 100 and applying a scan signal (or a driving signal), and a data driver IC (or a source driver IC) for applying the image signal to a data line of the display panel 100. According to an exemplary embodiment of the present invention, when the gate driver IC selects the gate line and applies a scan signal to change a specific pixel PX into an active state, the data driver IC may apply the image signal to the specific pixel PX through the data line. The timing controller may adjust a transmission time of a signal to be transmitted to the driver IC, and thus, may prevent a display time difference that may occur during the process of outputting on the display panel 100.

The pinhole array mask layer 400 is disposed on at least a part of a back surface of the display panel 100, for example, at a lower center portion of the display panel 100, and the optical image sensor 200 is disposed on at least a part of a back surface of the pinhole array mask layer 400. Details of the pinhole array mask layer 400 and the optical image sensor 200 will be described below.

The bracket 21 may have a substantially equal or similar size as the transparent cover layer 330, and may support the display panel 100 therein. According to an exemplary embodiment of the present invention, the bracket 21 may be at least partially covered by the bending portion 23 of the display panel 100. For example, a portion of the display panel 100 excluding the bending portion 23 is placed on a front surface of the bracket 21, and the bending portion 23 of the display panel 100 may be curved to cover one side surface and a part of a back surface of the bracket 21. According to an exemplary embodiment of the present invention, the bracket 21 may be coated with an adhesive material or may include an adhesive layer in at least a part of the area where it contacts the display panel 100 so that the display panel 100 may be secured thereto. In addition, the bracket 21 may secure and support the optical image sensor 200. The bracket 21 may have a groove 25 corresponding to a step difference between the optical image sensor 200 and the display panel 100.

The printed circuit board 24 may be disposed below the bracket 21 and various electronic components may be mounted on the printed circuit board 24. For example, at least one electronic element, circuit line or the like may be disposed on the printed circuit board 24 and at least some of these electronic components may be electrically connected to each other. The electronic components may include, for example, the controller 60, the memory 70, the wireless transceiver 80 or the like. According to exemplary embodiments of the present invention, the display drive circuit may be electrically connected to the printed circuit board 24 or disposed on the printed circuit board 24. In addition, a drive circuit for driving the optical image sensor 200, a circuitry for processing the image data output from the optical image sensor 200, or the like may be electrically connected to the printed circuit board 24 or may be disposed on the printed circuit board 24. According to exemplary embodiments of the present invention, the printed circuit board 24 may include a plurality of printed circuit boards 24, and at least some of the plurality of printed circuit boards 24 may be electrically connected to each other.

The housing 20 may secure and support the internal components of the display device 10. According to an exemplary embodiment of the present invention, the display panel 100, the pinhole array mask layer 400, the optical image sensor 200, the bracket 21, and the printed circuit board 24 may be stacked in sequence to be seated on the housing 20.

According to exemplary embodiments of the present invention, at least one surface of the housing 20 may include a metallic material. According to an exemplary embodiment of the present invention, a side surface of the housing 20 may include a metal frame. According to exemplary embodiments of the present invention, the transparent cover layer 330 may be detachably attached to the housing 20. According to an exemplary embodiment of the present invention, the transparent cover layer 330 may cover the front surface of the housing 20 and may be secured at the side surface of the housing 20.

The back surface cover 22 may define an exterior appearance of a back surface of the display device 10. According to exemplary embodiments of the present invention, the back surface cover 22 may be detachable from the housing 20. According to an exemplary embodiment of the present invention, the back surface cover 22 may cover a back surface of the housing 20 and may be secured at a side surface of the housing 20.

According to exemplary embodiments of the present invention, the display device 10 may omit at least one of the components described above, or may further include at least one other component. According to an exemplary embodiment of the present invention, the display device 10 may further include a touch sensing layer 310. The touch sensing layer 310 may be laminated between the transparent cover layer 330 and the display panel 100. The touch sensing layer 310 may include a touch sensor capable of sensing contact or approach of a touch object such as a part of a user's body or an electronic pen. In addition, the display device 10 may further include a battery capable of supplying power to the display device 10.

Hereinafter, each component of the display device 10 according to an exemplary embodiment of the present invention will be described in more detail with reference to FIG. 3B.

Referring to FIG. 3B, the optical image sensor 200 for detecting a fingerprint pattern of a user's finger 40 is disposed below the display panel 100, for example. For example, the optical image sensor 200 includes an IC substrate and image sensing circuitry carried by the IC substrate. The optical image sensor 200 may be coupled to a circuit board 220, for example, a flexible substrate. The optical image sensor 200 may be a backlight sensor or a backlight illumination (BSI) image sensor. The optical image sensor 200 may include, for example, complementary metal oxide semiconductor (CMOS), charge coupled device (CCD), or the like.

The optical image sensor 200 may include various filters, for example, red filters, green filters, blue filters, or the like. In addition, the optical image sensor 200 may include a filter that blocks red, for example, a green or blue filter. In addition, the optical image sensor 200 may include a filter for blocking infrared rays.

A light emitted from the display panel 100 may be directed to the user's finger 40 and a light reflected from the finger may be directed toward the optical image sensor 200. In other words, the pixel PX included in the display panel 100 serves as a light source for capturing an image of a fingerprint pattern.

The pixel PX may include, for example, a red pixel R, a green pixel G and a blue pixel B, for example. The red pixel R, the green pixel G and the blue pixel B may have a red color filter, a green color filter and a blue color filter, respectively. The pixel PX may also include a white pixel W. The white pixel W may have a white color filter or no separate filter. However, exemplary embodiments of the present invention are not limited thereto, and the display panel 100 may use various color pixels, an invisible light source (e.g., infrared (IR) or ultraviolet (UV)), and/or other types of light sources. The pixel PX of the display panel 100 may be synchronized with the signal acquisition of the optical image sensor 200. The detailed structure of the display panel 100 will be described below.

A protective film 300 may be disposed below a display layer of the display panel 100, for example, between the display layer and the pinhole array mask layer 400. The protective film 300 may be attached to a lower portion of the display layer, for example, to a lower portion of the substrate, using an adhesive. The protective film 300 may improve the strength of the display panel 100 and prevent the display panel 100 from being damaged. The protective film 300 may include a flexible plastic material. In addition, the protective film 300 may have various thicknesses depending on Young's modulus.

An optically transparent support member 210 may be disposed on the optical image sensor 200. The optically transparent support member 210 may hereinafter be referred to as "the support member 210," The support member 210 separates the pinhole array mask layer 400 and the optical image sensor 200 so that they are spaced apart from each other. In other words, the support member 210 is disposed between the optical image sensor 200 and the pinhole array mask layer 400. In addition the support member 210 may be a capping layer 150 for protecting sensing elements CE of the optical image sensor 200. An optically transparent adhesive layer may be disposed above and/or below the support member 210.

The pinhole array mask layer 400 is disposed on the optical image sensor 200, and is spaced apart from the optical image sensor 200 by a distance, for example, in a range from about 0.25 mm to about 4.0 mm. For example, the optical image sensor 200 may be spaced apart from the optical image sensor 200 by about 1 mm or less. For example, the pinhole array mask layer 400 is disposed on an upper surface of the support member 210. The upper surface of the support member 210 may be a surface of the support member 210 not in contact with the optical image sensor 200. The pinhole array mask layer 400 is an opaque mask and has a plurality of pinholes PH through which light may pass. The pinholes PH may be spaced apart from each other uniformly or, for example, in a honeycomb pattern. A pitch of the interval of the pinholes PH may be, for example, in a range from about 40 µm to about 127 µm. More specifically, the pitch of the interval of the pinholes PH may be in a range from about 40 µm to about 85 µm. In addition, a width (e.g., diameter) of each of the pinholes PH may be, for example, in a range from about 20 µm to about 80 µm. Specific numerical values related to the pinhole array mask layer 400 will be described below.

The pinhole array mask layer 400 is opaque and thus does not allow light to pass through. The pinhole array mask layer 400 may include chromium, for example, a chromium layer, to provide opacity. The opacity of the pinhole array mask layer 400 may be provided by using a layer form or using materials other than the layer form.

The display panel 100, or more particularly, the display layer, which is a part of the display panel 100, is on the pinhole array mask layer 400. As described above, the display layer includes a plurality of pixels PX for displaying images, for example. In particular, the display layer may be a part of an organic light emitting diode ("OLED") display panel. The pixels PX may be spaced apart from each other so that the light reflected by the finger may pass through the pixels PX and may be aligned with the pinholes PH.

In an exemplary embodiment of the present invention, the touch sensing layer 310 may be disposed on the display layer. For example, the display layer may include a substrate 110 (see FIG. 5) and a thin film encapsulation layer 160 (see FIG. 5) on the substrate 110. In such an embodiment, the touch sensing layer 310 may be located on the thin film encapsulation layer 160 of the display layer. For example, the touch sensing layer 310 may be positioned between the thin film encapsulation layer 160 of the display layer and the transparent cover layer 330.

In an exemplary embodiment of the present invention, the touch sensing layer 310 may be positioned within the display layer, for example, between the substrate 110 and the thin film encapsulation layer 160.

In an exemplary embodiment of the present invention, the touch sensing layer 310 may be a touch panel separate from the display panel 100. The touch sensing layer 310 may include a metal touch electrode for sensing a touch, and an insulating layer, an adhesive layer, or a protective film above or below the touch electrode.

The transparent cover layer 330 is disposed on the touch sensing layer 310. An optically transparent adhesive layer 320 may be disposed between the touch sensing layer 310 and the transparent cover layer 330. The transparent cover layer 330 including onyx or the like is located on the display layer and defines a finger placement surface capable of accommodating a finger of the user. For example, the transparent cover layer 330 is secured by the optically transparent adhesive layer 320, and an upper surface of the transparent cover layer 330 defines the finger placement surface 331 to accommodate the user's finger 40.

The optical image sensor 200, and more particularly, image sensing circuitry, senses the user's finger 40 or an image of an object disposed adjacent the finger placement surface 331 and, based thereon, may perform one or more biometric functions of, for example, user authentication (e.g., matching operation), a biometric registration function, and/or a falsification detection function. In addition, in the case that the display device 10 is a touch display, e.g., the display device 10 includes the touch sensing layer 310, when the user touches the touch display, for example, in a navigation function or other touch display input, data from the user's finger 40 may be sensed or obtained by the optical image sensor 200 for finger matching and/or forgery detection.

The light from the pixels PX of the display layer is scattered based on the finger 40 of the user contacting the finger placement surface 331 or located apart from the finger placement surface 331. When the light is scattered it is captured by the optical image sensor 200 through transparent portions of the display layer and the pinholes PR of the pinhole array mask layer 400.

Figure 4:
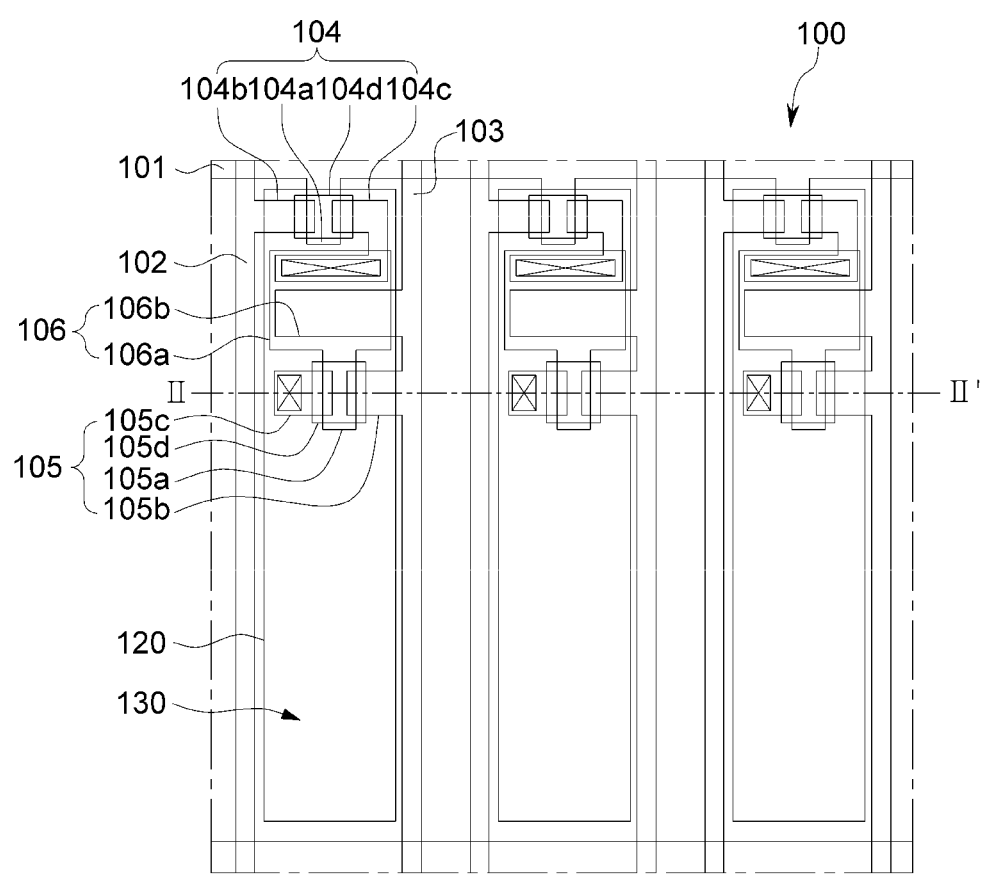
FIGS. 4 and 5 are a plan view and a cross-sectional view illustrating a display panel according to an exemplary embodiment of the present invention.
Figure 5:
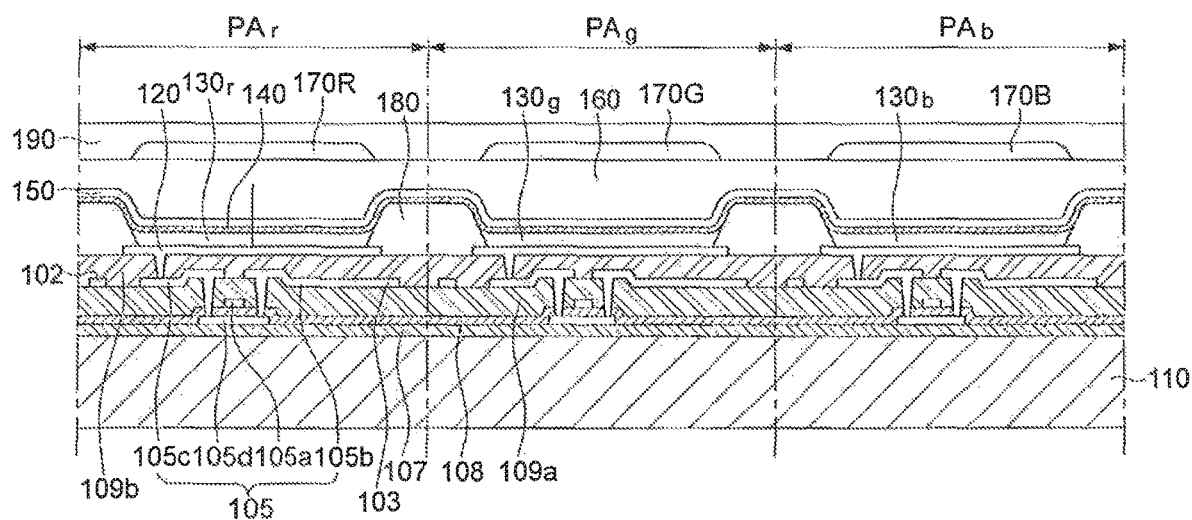

FIGS. 4 and 5 are a plan view and a cross-sectional view illustrating a display panel according to an exemplary embodiment of the present invention.

Referring to FIGS. 4 and 5, the display panel 100 according to an exemplary embodiment of the present invention includes a gate line 101 disposed along one direction, a data line 102 insulated from and intersecting the gate line 101, a common power line 103, a switching thin film transistor ("TFT") 104, a driving TFT 105, and a capacitor 106.

In other words, one pixel of a display device according to an exemplary embodiment of the present invention has a 2TFT-1CAP structure including two TFTs and one capacitor 106. However, exemplary embodiments of the present invention are not limited thereto, and one pixel may include three or more TFTs and two or more capacitors.

The switching TFT 104 selects a pixel to emit light. The switching TFT 104 includes a switching gate electrode 104a connected to the gate line 101, a switching source electrode 104b connected to the data line 102, a switching drain electrode 104c connected to a first capacitor plate 106a, and a switching semiconductor layer 104d.

The driving TFT 105 applies a driving power, which allows an organic light emitting layer 130 in a pixel selected by the switching ITT 104 to emit light. The driving TFT 105 includes a driving gate electrode 105a connected to the first capacitor plate 106a, a driving source electrode 105b connected to the common power line 103, a driving drain electrode 105c connected to a first electrode 120, and a driving semiconductor layer 105d.

The capacitor 106 includes the first capacitor plate 106a and a second capacitor plate 106b. The first capacitor plate 106a is connected to the switching drain electrode 104c and the driving gate electrode 105a, and the second capacitor plate 106b is connected to the common power line 103. The capacitance of the capacitor 106 is determined by electric charges accumulated in the capacitor 106 and a voltage across the first capacitor plate 106a and the second capacitor plate 106b.

A voltage equivalent to a difference between a common voltage applied to the driving TFT 105 from the common power line 103 and the data voltage transmitted by (or from) the switching TFT 104 is stored in the capacitor 106, and a current corresponding to the voltage stored in the capacitor 106 flows to the organic light emitting layer 130 through the driving TFT 105 such that the organic light emitting layer 130 may emit light.

The first substrate 110 may include an insulating material including glass, quartz, ceramic or plastic. However, exemplary embodiments of the present invention are not limited thereto, and the first substrate 110 may include a metallic material, such as stainless steel.

The first substrate 110 includes red, green, and blue pixel areas $PA_r$, $PA_g$, and $PA_b$. The red, green and blue pixel areas $PA_r$, $PA_g$ and $PA_b$ are defined by a pixel defining layer 180 to be described below, and the red, green and blue pixel areas $PA_r$, $PA_g$ and $PA_b$ may be sequentially disposed on the first substrate 110. In addition, the first substrate 110 may include a white pixel area.

A buffer layer 107 is disposed on the first substrate 110. The buffer layer 107 may prevent moisture or impurities from penetrating through the first substrate 110 and planarize a surface of the first substrate 110. The buffer layer 107 may include an inorganic insulating layer or an organic insulating layer, and may be deposited on the first substrate 110 using various deposition methods, such as a plasma enhanced chemical vapor deposition (PECVD) method, an atmospheric pressure chemical vapor deposition (APCVD) method, or a low pressure chemical vapor deposition (LPCVD) method, using $SiO_2$ or $SiN_x$. However, exemplary embodiments of the present invention are not limited thereto, and the buffer layer 107 may be omitted.

The driving semiconductor layer 105d is disposed on the buffer layer 107, and the driving semiconductor layer 105d includes a source area, a drain area, and a channel area therebetween.

A gate insulating layer 108 is disposed on the buffer layer 107 to cover the driving semiconductor layer 105d, and the gate insulating layer 108 prevents penetration of moisture or impurities through the first substrate 110. The gate insulating layer 108 includes an insulating material and may be a single layer or multiple layers of silicon nitride (SiNx) or silicon oxide (SiOx). However, exemplary embodiments of the present inventive concept are not limited thereto, and the gate insulating layer 108 may include various insulating materials.

The driving gate electrode 105a is disposed on the gate insulating layer 108, and an insulating interlayer 109a is disposed on the gate insulating layer 108 to cover the driving gate electrode 105a.

The driving source and drain electrodes 105b and 105c are disposed on the insulating interlayer 109a and spaced apart from each other, and the driving source and drain electrodes 105b and 105c contact a source area and a drain area of the driving semiconductor layer 105d through an opening in the gate insulating layer 108 and the insulating interlayer 109a, respectively.

A protective layer 109b is disposed on the insulating interlayer 109a to cover the driving source and drain electrodes 105b and 105c. The protective layer 109b protects the driving TFT 105, and may include an inorganic insulating layer or an organic insulating layer.

The first electrode 120, the organic light emitting layer 130, and a second electrode 140 are sequentially disposed on the protective layer 109b. The first electrode 120 may be an anode for injecting holes, and the second electrode 140 may be a cathode for injecting electrons. However, exemplary embodiments of the present invention are not limited thereto, and the first electrode 120 may be a cathode and the second electrode 140 may be an anode.

The organic light emitting layer 130 may include a low molecular organic material or a high molecular organic material. The organic light emitting layer 130 may include red, green and blue organic light emitting layers, and the red, green and blue organic light emitting layers 130r, 130g and 130b may be disposed in the red, green and blue pixel areas $PA_r$, $PA_g$ and $PA_b$, respectively. In such an embodiment, there may be no color filter to be described below. In addition, the organic light emitting layer 130 may include a single-color organic light emitting layer.

The display panel 100 according to an exemplary embodiment of the present invention has a top emission type structure, and thus, the first electrode 120 includes a reflective film and the second electrode 140 includes a transflective film.

The reflective film and the transflective film may include one or more metal of titanium (Ti), magnesium (Mg), silver (Ag), gold (Au), calcium (Ca), lithium (Li), chromium (Cr), and aluminum (Al), or an alloy thereof. In such an embodiment, whether an electrode is a transflective type or a reflective type depends on the thickness of the electrode. For example, the transflective film has a thickness of about 200 nm or less. In addition, the reflective film and the transflective film may have a multi-layer structure including a metal layer which includes a metal or an alloy of a metal and a transparent conductive oxide (TCO) layer laminated on the metal layer.

The first electrode 120 may further include a transparent conductive layer, and the transparent conductive layer may include transparent conductive oxide ("TCO"), such as indium tin oxide (ITO), indium zinc oxide (IZO) zinc oxide (ZnO), or indium oxide ($In_2O_3$).

The first electrode 120 may have a structure including just a reflective film, a double-layer structure including a reflective film and a transparent conductive film, or a triple-layer structure sequentially including a transparent conductive layer, a reflective layer, and a transparent conductive layer. However, exemplary embodiments of the present invention are not limited thereto, and the first electrode 120 may have a structure including just a transparent conductive film.

The second electrode 140 may have a structure including a transparent conductive film. When the second electrode 140 includes a transparent conductive film, the second electrode 140 may be an anode for injecting holes, and the first electrode 120 may be a cathode including a reflective layer.

In an exemplary embodiment of the present invention, the pixel defining layer 180 is disposed on the first electrode 120 to cover an edge of the first electrode 120 and expose a central portion of the first electrode 120. In other words, the first electrode 120, the organic light emitting layer 130, and the second electrode 140 are sequentially laminated in an opening of the pixel defining layer 180. The organic light emitting layer 130 and the second electrode 140 may also be formed on the pixel defining layer 180 as well.

A capping layer 150 may be disposed on the second electrode 140. The capping layer 150 protects the first electrode 120, the organic light emitting layer 130, and the second electrode 140 and allows the light generated in the organic light emitting layer 130 to be emitted outside efficiently.

The thin film encapsulation layer 160 is formed on the capping layer 150. The thin film encapsulation layer 160 seals the first electrode 120, the organic light emitting layer 130, the second electrode 140, and the capping layer 150 to protect them from penetration of moisture or oxygen.

The thin film encapsulation layer 160 may have a structure in which at least one organic layer and at least one inorganic layer are alternatively disposed. However, exemplary embodiments of the present invention are not limited thereto, and the thin film encapsulation layer 160 may include a single layer of an organic layer or an inorganic layer.

The red color filter 170R, the green color filter 170G and the blue color filter 170B may be disposed on the red pixel area PA$_r$, the green pixel area PA$_g$, and the blue pixel area PA$_b$ on the thin film encapsulation layer 160, respectively.

In addition, as described above in reference to FIG. 3B, the protective film 300 may be disposed below the first substrate 110, and the touch sensing layer 310 may be disposed above the color filters 170R, 170G, and 170B. In an exemplary embodiment of the present invention, a planarization layer 190 may be disposed between the color filters 170R, 170G, and 170B and the touch sensing layer 310. The planarization layer 190 flattens the layer on which the color filter 110 is disposed by removing the height difference of the color filter 110. The planarization layer 190 may include one or more materials of the following: a polyacrylate resin, an epoxy resin, a phenolic resin, a polyamide resin, a polyimide resin, an unsaturated polyester resin, a polyphenylen ether resin, a polyphenylene sulfide resin, and benzocyclobutene (BCE).

In an exemplary embodiment of the present invention, the touch sensing layer 310 may be disposed on the thin film encapsulating layer 160, and the color filters 170R, 170G, and 170B and the planarizing layer 190 may be disposed on the touch sensing layer 310.

Figure 6:
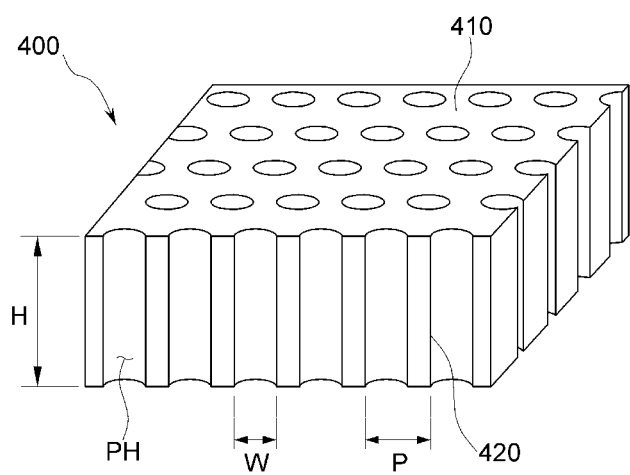
FIGS. 6 and 7 illustrate a pinhole array mask layer and an enlarged pinhole according to an exemplary embodiment of the present invention.
Figure 7:
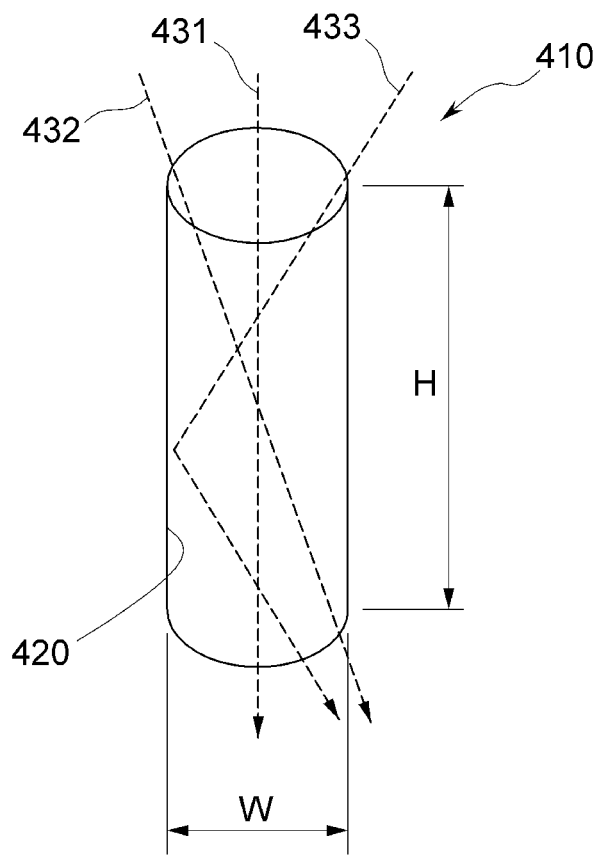

FIGS. 6 and 7 illustrate a pinhole array mask layer 400 and an enlarged pinhole according to an exemplary embodiment of the present invention.

The pinhole array mask layer 400 includes regularly arranged openings, e.g. pinholes PH. Each of the pinholes PH has a width W (e.g., diameter) and a height H (e.g., a thickness of the pinhole array mask layer 400). The pinholes PH may be arranged at a predetermined pitch P (e.g., interval). The pinhole PH may be an opening which passes through the opaque pinhole array mask layer 400. The pinhole PH may be filled with a transparent material.

Among lights scattered by the finger 40, only lights 431 and 432 that are incident to the pinhole array mask layer 400 at a predetermined angle or more, e.g., the light 431 that is substantially perpendicular with respect to the pinhole array mask layer 400, may pass through the pinhole PH. For example, in reference to FIG. 7, the lights 431 and 432 may be scattered light that does not come into contact with an inner wall of the pinhole PH. A light 433 that is incident obliquely to the pinhole array mask layer 400 at an angle less than the certain predetermined angle is blocked. For example, in reference to FIG. 7, the light 433 may be scattered light that contacts the inner wall of the pinhole PH. The angle of the light that may pass through the pinhole PH may be determined according to a ratio of the height H to the width W of the pinhole PH. According to an exemplary embodiment of the present invention, the ratio of the height H to the width W of the pinhole PH may be considerably lame so that a light scattered at one point of the finger 40 may pass through only one pinhole PH, e.g., a pinhole PH that is located vertically below that one point of the finger 40, and may not pass through other adjacent pinholes PH. For example, the ratio may be in a range from about 5 to about 20. However, exemplary embodiments of the present invention are not limited thereto, and the ratio may be in a range from about 1 to about 100.

In an example, a light obliquely incident to the pinhole PH at an angle less than the predetermined angle may be totally reflected on an inner circumferential surface of the pinhole PH to be captured by the optical image sensor 200. However, this may degrade the image quality and resolution of the captured fingerprint. Thus, according to an exemplary embodiment of the present invention, the inner circumferential surface of the pinhole PH may be matted-treated to reduce the total reflection of light.

The matte treatment may include a plasma treatment, a physical treatment such as sandblasting, a chemical treatment, or the like. Examples of the matte treatment may further include a vacuum etching method, a surface buff polishing method, a sandpaper polishing method, a method of forming a black complex by a chemical agent, or the like.

Figure 8:
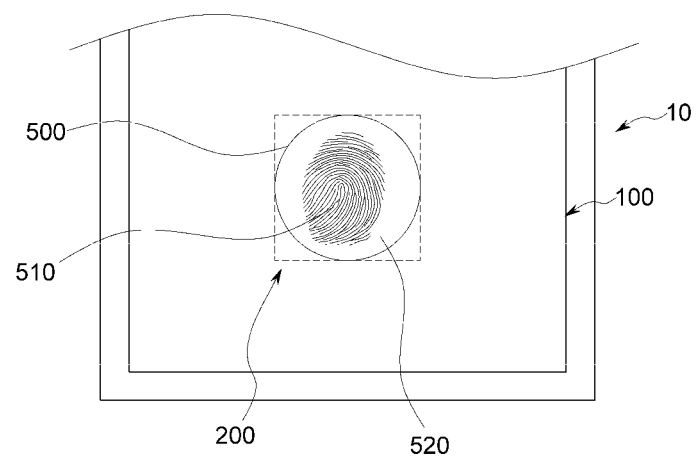
FIG. 8 is view illustrating a display device in which a fingerprint recognition area is displayed according to an exemplary embodiment of the present invention.
Figure 9:
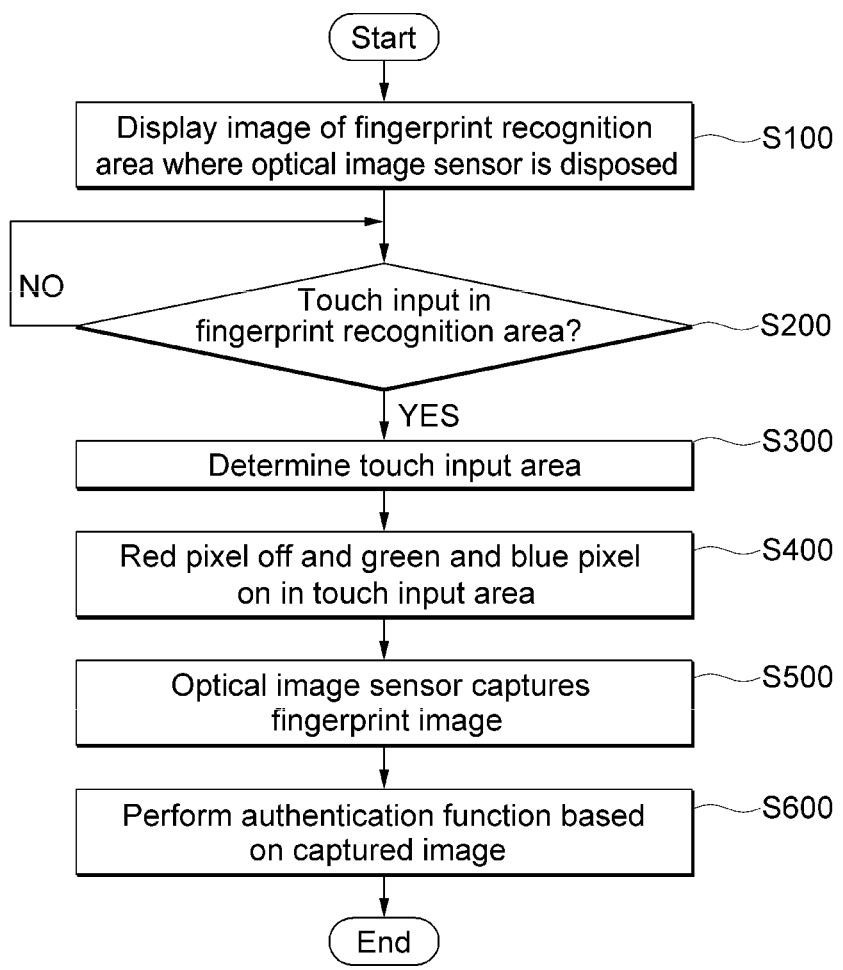
FIG. 9 is a flow diagram illustrating a method of a display device capturing a fingerprint image according to an exemplary embodiment of the present invention.

FIG. 8 is view illustrating a display device in which a fingerprint recognition area is displayed according to an exemplary embodiment of the present invention, and FIG. 9 is a flow diagram illustrating a method of a display device capturing a fingerprint image according to an exemplary embodiment of the present invention.

Referring to FIGS. 8 and 9, when fingerprint recognition is required, for example, when an application which requires user authentication is activated, the controller 60 displays an image 500 indicating a fingerprint recognition area on a display area of the display panel 100 (S100). The fingerprint recognition area may correspond to an area in which the optical image sensor 200 is disposed, in other words, a fingerprint recognizable area. The fingerprint recognizable area may overlap a part of or all of the display area. The image 500 may overlap a part of or all of the fingerprint recognition area. However, exemplary embodiments of the present invention are not limited thereto, and the image 500 may not be displayed.

The touch sensing layer 310 senses the touch of the finger 40 input in the fingerprint recognition area (S200).

When the touch input is detected, the controller 60 determines a touch input area (S300). For example, as illustrated in FIG. 8, an area 510 in which a touch is input and an area 520 in which a touch is not input are identified in the fingerprint recognition area.

The controller 60 stops the emission of the red pixel R in the area 510 where the touch is input, and allows only the green pixel G and/or the blue pixel B to emit light, for example, at a maximum brightness (S400). At this time, the area 520 where the touch is not input may continue to display an image, for example, the image that was being displayed immediately before the touch was recognized. Accordingly, the light source for fingerprint recognition emits light only in the area 510 where the touch is input, e.g., the area covered by the finger 40, and thus, such a light source may not be viewed by the user. Accordingly, although the red pixel R does not emit light, the user may not notice a change in the displayed image.

The optical image sensor 200 synchronized with the light emission of the green pixel G and/or the blue pixel B captures the fingerprint image (S500). In this case, only the green light and/or the blue light is incident on the optical image sensor 200, and the red light is not incident thereto.

The controller 60 may perform user authentication based on the captured image (S600). For example, the controller 60 may perform a predetermined authentication function.

Accordingly, in an exemplary embodiment of the present invention, the resolution of the fingerprint image captured by the optical image sensor 200 may be increased by excluding the red light source (see FIGS. 10A to 11D). In addition, in an embodiment of the present invention, the light source for fingerprint recognition may not be visible by the user since the light source emits light only in the area 510 where the touch is input, e.g., the area covered by the finger 40. Accordingly, although the red pixel does not emit light, the user may not notice the change in the displayed image.

FIGS. 10A to 11D are images captured using a pinhole PH of a predetermined width and a light source.

Figure 10A:
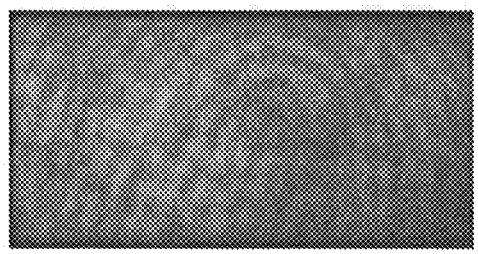
FIGS. 10A, 10B, 10C, 10D, 11A, 11B, 11C and 11D are images captured using a pinhole of a predetermined width and a light source.
Figure 10B:
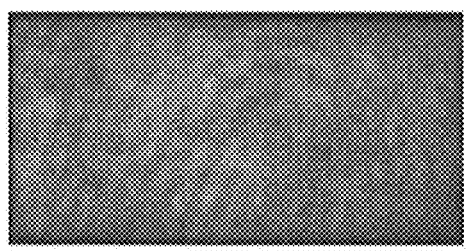
Figure 10C:
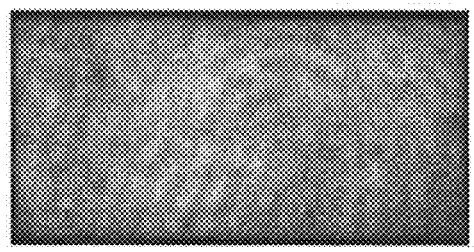
Figure 10D:
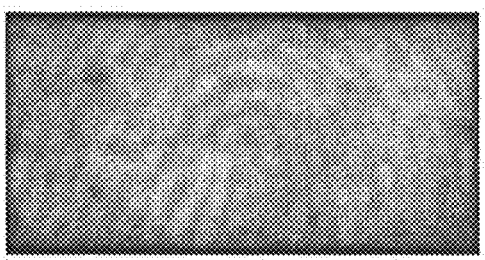
Figure 11A:
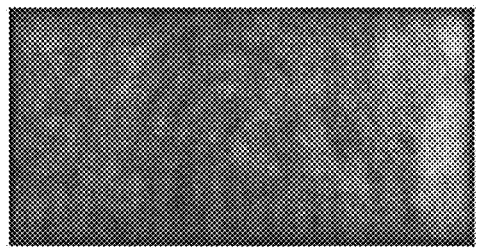
Figure 11B:
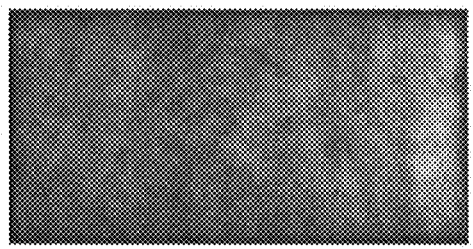
Figure 11C:
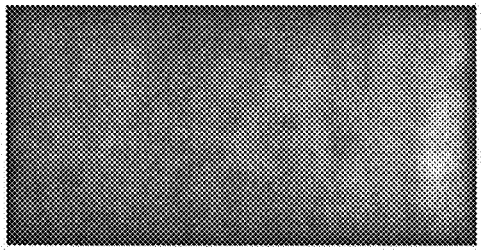
Figure 11D:
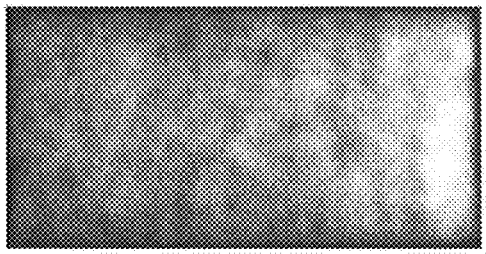

FIGS. 10A to 10D are captured images when the pinhole PH has a width W of about 50 μm or less, and FIGS. 11E to 11D are captured images when the pinhole PH has a width W of about 40 μm or less. FIGS. 10A and 11A are images captured when the blue pixel B of the display layer is used as the light source for fingerprint image capture, FIGS. 10B and 11B are images captured when the green pixel G is used as the light source for fingerprint image capture, FIGS. 10C and 11C are images captured when the red pixel R is used as the light source for fingerprint image capture, and FIGS. 10D and 11D are images captured when the white pixel W is used as the light source for fingerprint image capture.

The images of FIGS. 10A to 10D are clearer than the images of FIGS. 11A to 11D, respectively. This is because if the width W of the pinhole PH becomes less than a predetermined value, diffraction becomes even greater and the resolution of the image is lowered. In addition, when the images of FIGS. 10A to 10D are compared with each other, the image becomes blurred as a wavelength of the light source becomes longer, in other words, in the order of blue light, green light and red light. This is because as the wavelength of the light source becomes longer, the more diffraction occurs, thus lowering the resolution.

As illustrated in FIGS. 10C and 11C, the captured image of the case where only the green pixel G or the blue pixel B are emitted for fingerprint recognition according to an exemplary embodiment of the present invention is clearer as compared with the captured image when pixels of all colors are emitted for fingerprint recognition (for example, the images of FIGS. 10D and 11D).

Figure 12:
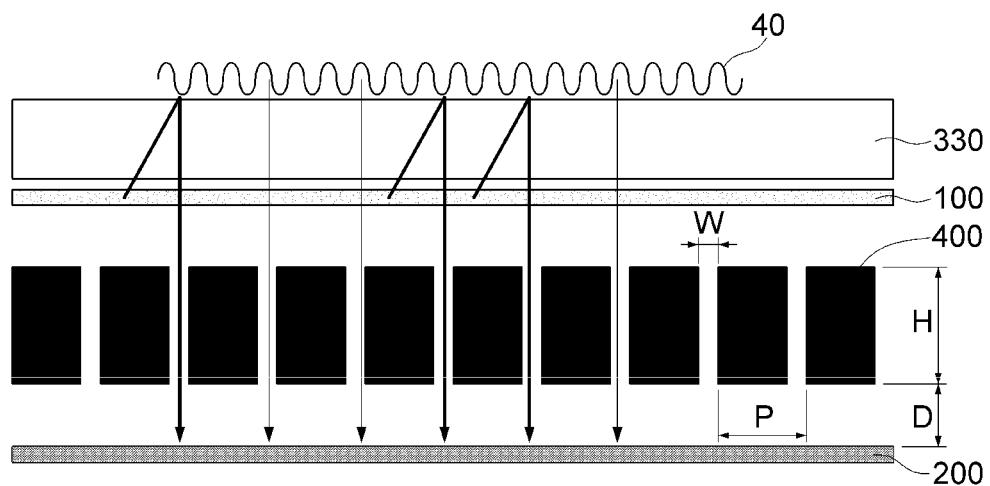
FIG. 12 is a schematic cross-sectional view illustrating a display device according to an exemplary embodiment of the present invention.

FIG. 12 is a schematic cross-sectional view illustrating a display device according to an exemplary embodiment of the present invention. FIG. 12 is a view for explaining the arrangement of the optical image sensor 200, the pinhole array mask layer 400, the display layer of the display panel 100, and the transparent cover layer 330. Accordingly, other components are omitted.

A resolution of the image captured by the optical image sensor 200 depends on the pitch P of the pinhole PH, the diameter W of the pinhole PH, and the distance D between the pinhole mask layer 400 and the optical image sensor 200. A distance between the pinhole mask layer 400 and the finger placement surface 331 and the thickness H of the pinhole mask layer 400 may also affect the resolution of the image.

According to an exemplary embodiment of the present invention, the pitch P has a value of about 127 um or less. For example, the pitch may have a value of about 85 um or less. As illustrated in FIG. 12, only light that is substantially perpendicular to the pinhole mask layer 400 among the light scattered by the finger 40 is incident to the optical image sensor 200. Accordingly, to provide a fingerprint image of sufficient resolution, the resolution of the pinhole array mask layer 400, in other words, 1/P, should be sufficiently large. When the pitch P is about 127 μm, a resolution or a separating power of about 200 ppi or more may be achieved, and when the pitch P is about 85 um, a resolution or a separating power of about 300 ppi or more may be achieved.

Figure 13A:
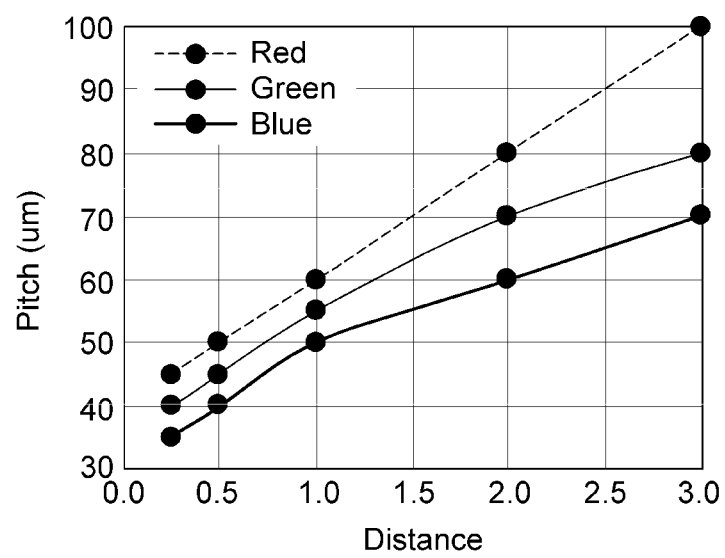
FIG. 13A is a graph showing values of a pitch of pinholes depending on a distance between a pinhole array mask layer and an optical image sensor according to an exemplary embodiment of the present invention.
Figure 13B:
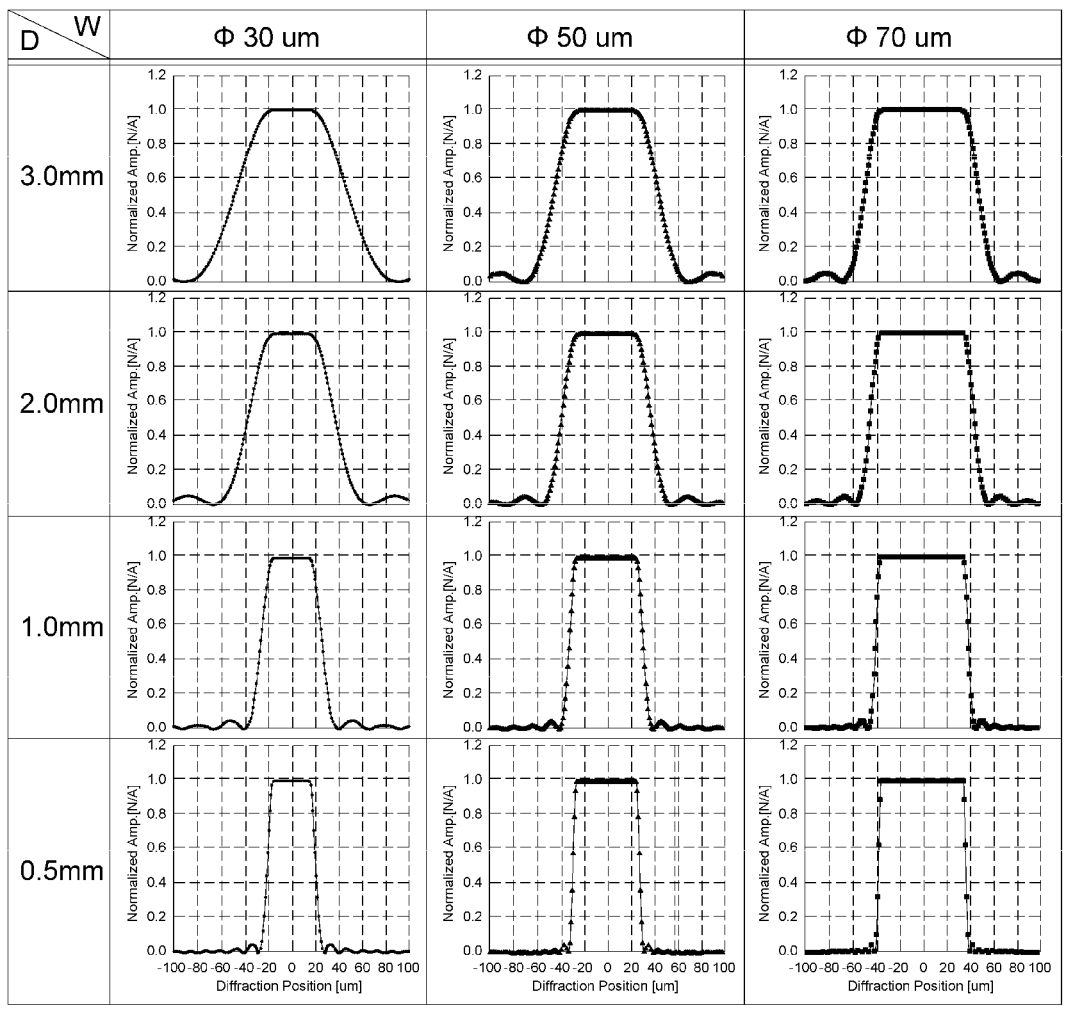
FIG. 13B is a graph showing the intensity of diffracted light for each position depending on the distance between the pinhole array mask layer and the optical image sensor and depending on the diameter of the pinhole according to an exemplary embodiment of the present invention.

FIG. 13A is a graph showing values of the pitch P of the pinholes PH depending on a distance between the pinhole array mask layer 400 and the optical image sensor 200 according to an embodiment of the present invention. FIG. 13B is a graph showing the intensity of diffracted light for each position depending on the distance between the pinhole array mask layer 400 and the optical image sensor 200 and depending on the diameter D of the pinhole PH.

According to an exemplary embodiment of the present invention, a minimum value of the pitch P of the pinhole PH to prevent the interference of the lights passing through adjacent pinholes PH is shown in FIG. 13A.

In FIG. 13A, a transverse axis represents the distance D (unit mm) between the pinhole array mask layer 400 and the optical image sensor 200, and a vertical axis represents the pitch P (unit urn) of the pinholes PH. In the case of a green light (e.g., 530 nm), the pitch P is about 40 μm or more when the distance D is about 0.25 mm, the pitch P is about 45 μm or more when the distance D is about 0.50 mm, the pitch P is about 55 μm or more when the distance D is about 1.0 mm, the pitch P is about 70 μm or more when the distance D is about 2.0 mm, and the pitch P is about 80 μm or more when the distance D is about 3.0 mm.

As illustrated in FIG. 13A, since the red light (e.g., 760 nm) is diffracted more, the value of the pitch P is larger than the case of using the green light source by about 5 μm to about 20 μm. In addition, since the blue light (e.g., 380 nm) is diffracted less, the value of the pitch P is larger than the case of using the green light source by about 5 μm to about 10 μm.

In FIG. 13B, a transverse axis represents the distance from a central portion of the pinhole PH (e.g., Diffraction Position [μm], and a vertical axis represents the intensity of light incident on the corresponding position (Normalized Amp [N/A]).

As illustrated in FIG. 13B, a light having passed through one pinhole PH may be diffracted and incident to the optical image sensor 200 at an area corresponding to another pinhole PH that is adjacent to the one pinhole PH. Accordingly, this may adversely affect the resolution of the image. In addition, as the distance D between the pinhole array mask layer 400 and the optical image sensor 200 increases from about 0.5 mm to about 3 mm and the diameter W of the pinhole PH decreases from about 70 µm to about 30 µm, the light is diffracted more. Accordingly, as described with reference to FIG. 13A, the pitch P of the pinhole PH should increase as the distance D becomes larger and the diameter W becomes less.

FIGS. 14A to 14D are simulation graphs illustrating diffraction spread of the optical image sensor 200 depending on the diameter D of the pinhole PH with respect to respective given distances between the pinhole array mask layer 400 and the optical image sensor 200.

In FIGS. 14A to 14D, a vertical axis represents diffraction spread or resolution (um), and a transverse axis represents the diameter W (µm) of the pinhole PH. The dashed lines correspond to blurring due to the diffraction by, for example, the small pinhole PH, and the solid lines correspond to the sum of blurring due to the diffraction and blurring due to the diameter of the pinhole PH. In addition, the solid lines of three different thicknesses show simulation results using a red light source, a green light source, and a blue light source, respectively. The quadrangular columns in each of FIGS. 14A, 14B, 14C and 14D represent optimum values of the diameter W (µm) of the pinholes.

Figure 14A:
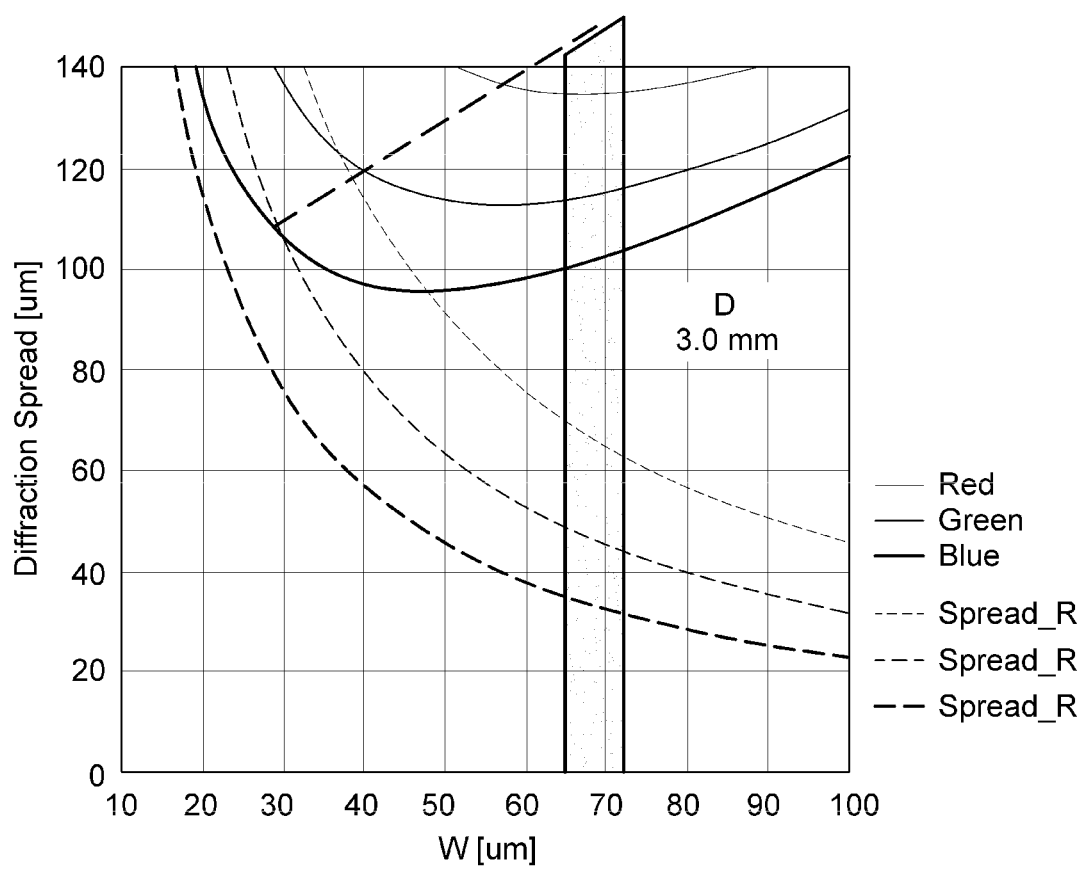
FIGS. 14A, 14B, 14C and 14D are simulation graphs illustrating diffraction spread of the optical image sensor depending on the diameter of the pinhole with respect to respective given distances between the pinhole array mask layer and the optical image sensor.
Figure 14B:
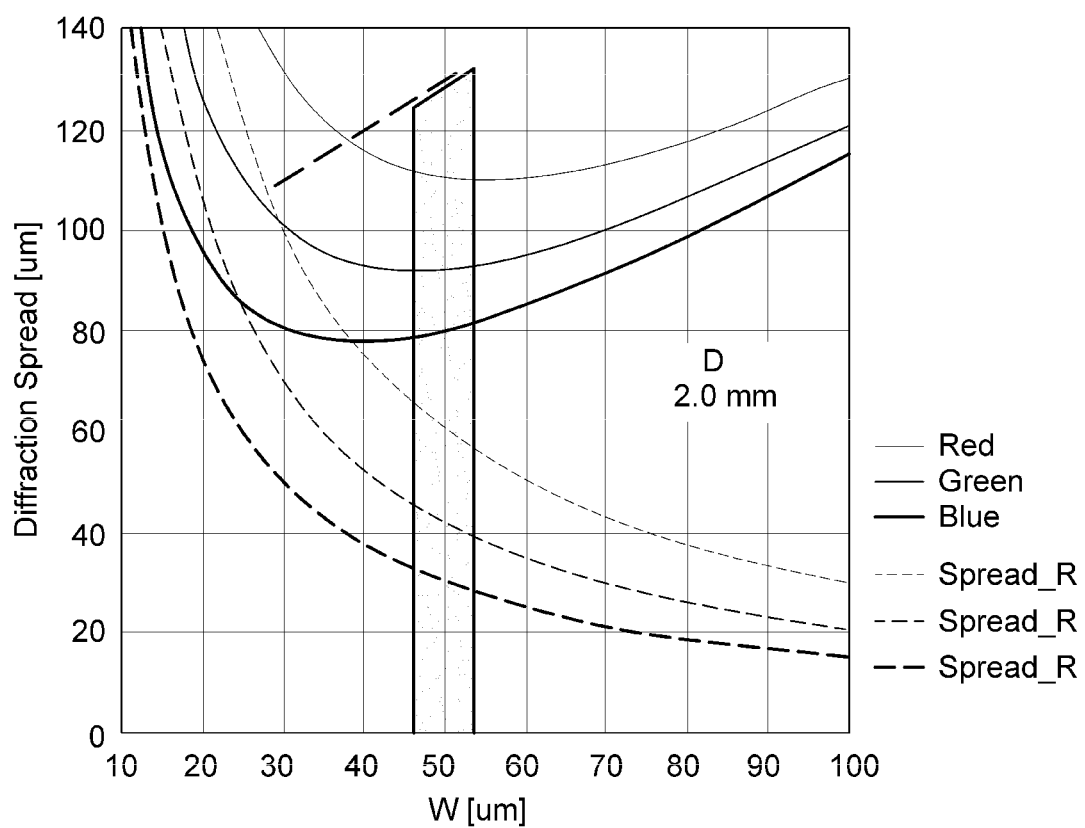
Figure 14C:
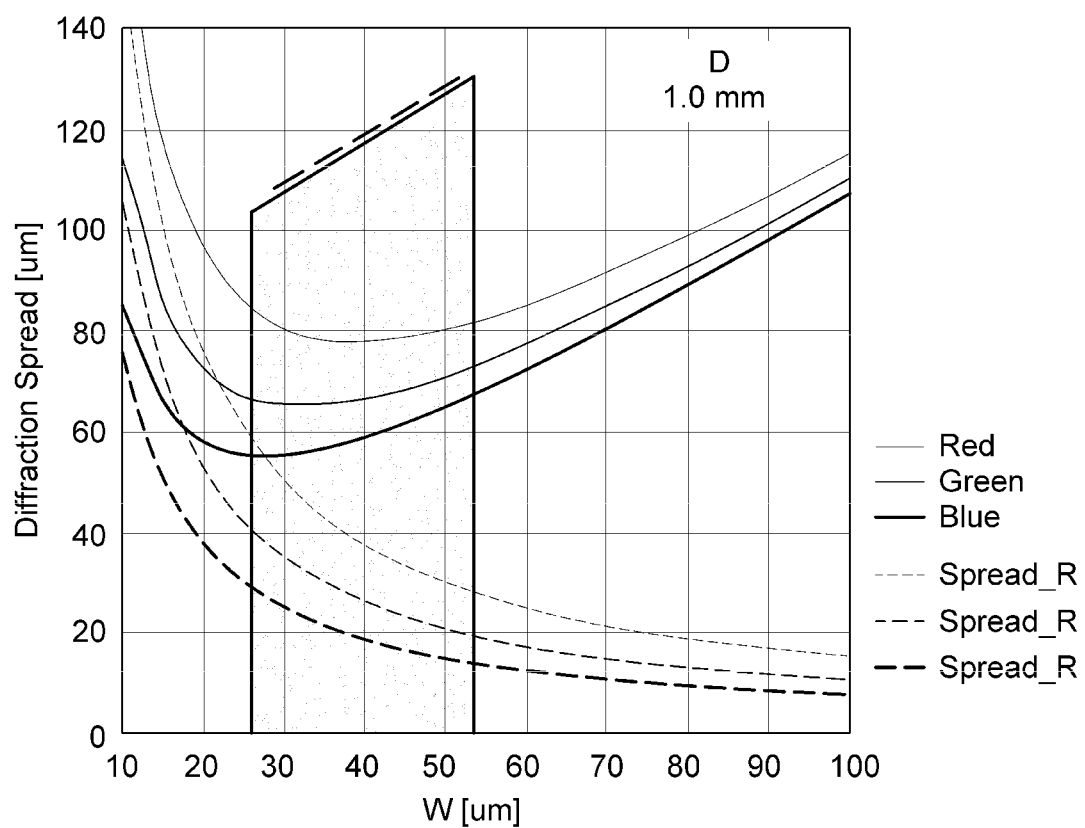
Figure 14D:
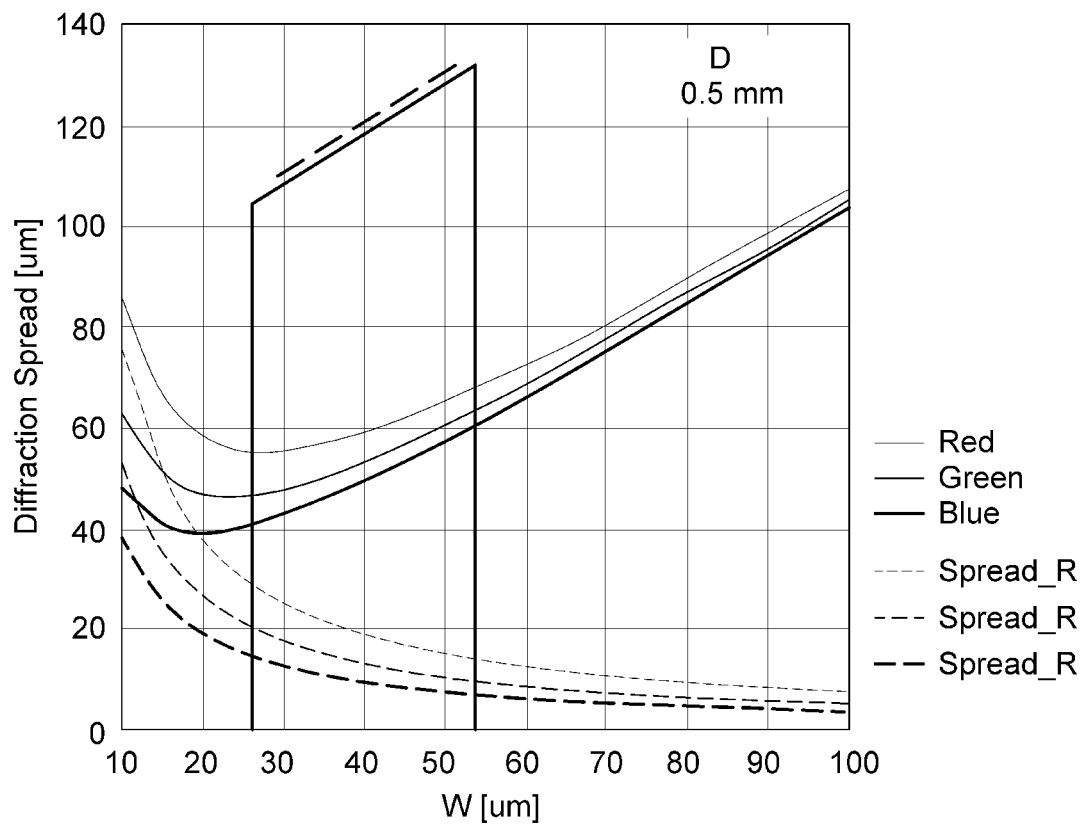

The distance D between the pinhole array mask layer and the optical image sensor is about 3.0 mm in FIG. 14A, about 2.0 mm in FIG. 14B, about 1.0 mm in FIG. 14C, and about 0.5 mm in FIG. 14D. As illustrated in FIGS. 14A to 14D, the larger the distance D, the worse the resolution.

According to an exemplary embodiment of the present invention, the optimum value of the diameter W at each distance D is as follows. For example, in consideration of a signal-to-noise ratio (SNR), the diameter W of the pinhole PH is selected to be somewhat larger than the optimally determined resolution. The diameter W of the pinhole PH is in a range from about 65 µm to about 75 µm when the distance D is about 3.0 mm, the diameter W of the pinhole PH is in a range from about 45 µm to about 55 µm when the distance D is about 2.0 mm, the diameter W of the pinhole PH is in a range from about 25 µm to about 55 µm or less when the distance D is about 1.0 mm, and the diameter W of the pinhole PH is in a range from about 25 µm to about 55 µm when the distance D is about 0.5 mm.

Accordingly, in an embodiment of the present invention, the width of the pinhole PH is about 65 µm or more when the distance D is about 3.0 mm or more and about 4.0 mm or less, the width of the pinhole PH is in a range from about 45 µm to about 75 µm when the distance D is about 2.0 mm or more and about 3.0 mm or less, the width of the pinhole PH is in a range from about 25 µm to about 55 µm when the distance D is about 1.0 mm or more and about 2.0 mm or less, and the width of the pinhole PH is in a range from about 25 µm to about 55 µm when the distance D is about 0.5 mm or more and about 1.0 mm or less.

Figure 15:
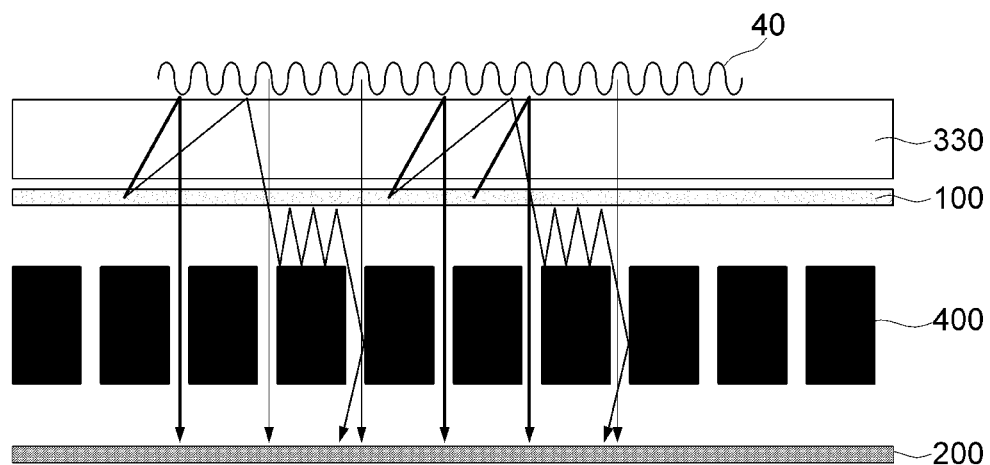
FIG. 15 is a cross-sectional view for explaining reflection of light between a display layer and a pinhole array mask layer, according to an exemplary embodiment of the present invention.

FIG. 15 is a cross-sectional view for explaining reflection of light between a display layer of the display panel 100 and a pinhole array mask layer 400, according to an exemplary embodiment of the present invention.

As illustrated in FIG. 15, the light that has passed through the display layer of the display panel 100 and that has been obliquely incident to the pinhole array mask layer 400 may be repeatedly reflected between an upper surface of the pinhole array mask layer 400 and a lower surface of the display layer to pass through an adjacent pinhole PH. Therefore, the quality of the image captured by the optical image sensor 200 may be degraded.

Figure 16A:
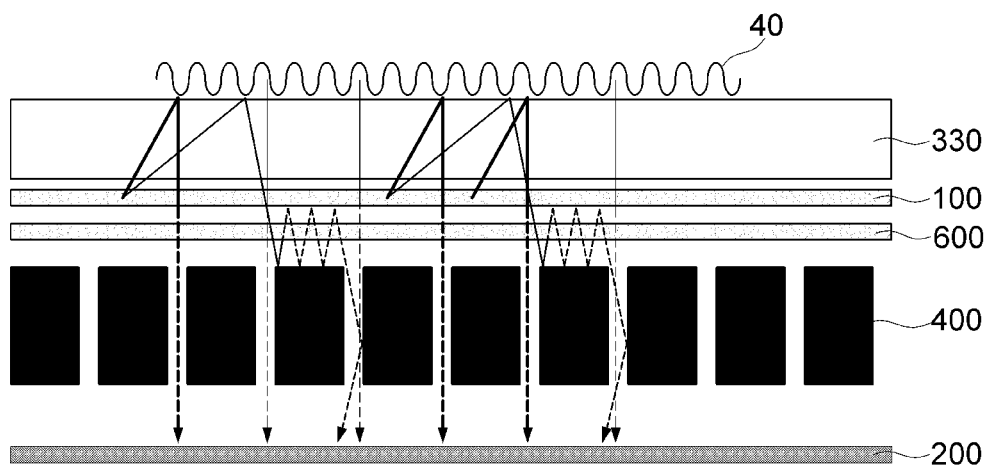
FIGS. 16A, 16B and 16C are cross-sectional views schematically illustrating display devices for preventing reflection of light between pinhole array mask layers according to an exemplary embodiment of the present invention.
Figure 16B:
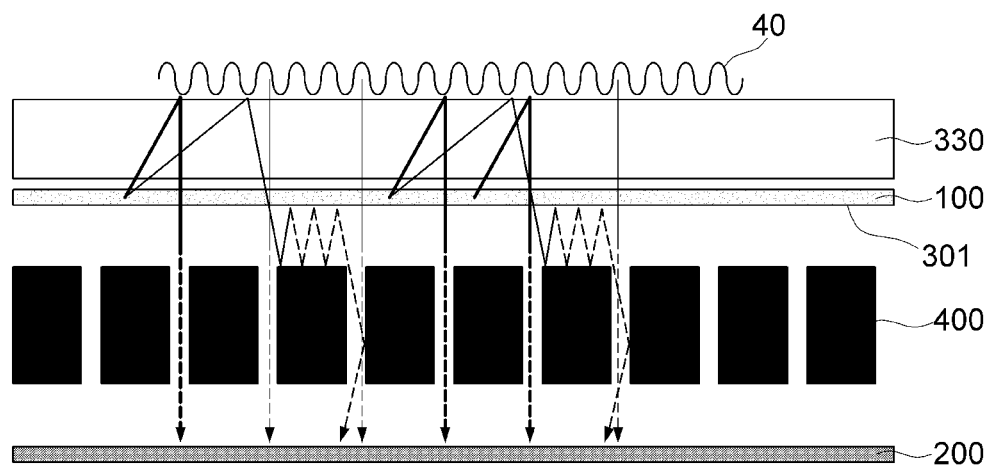
Figure 16C:
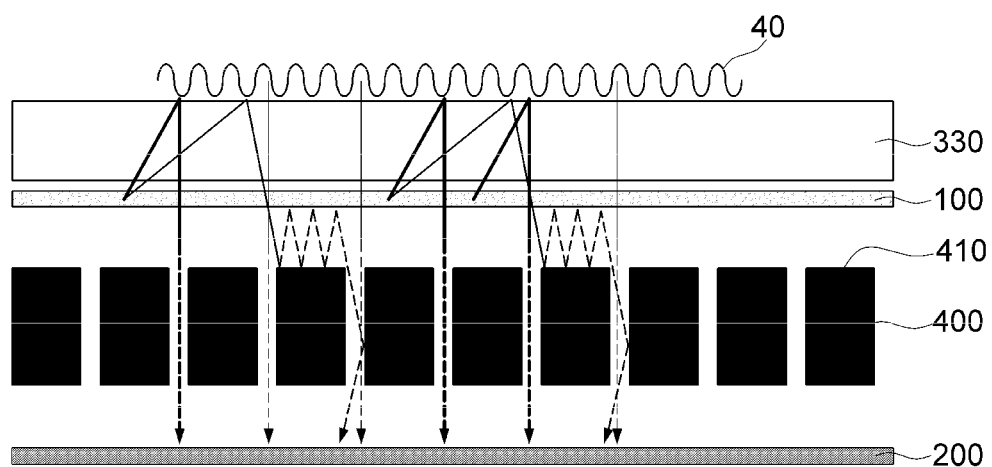

FIGS. 16A to 16C are cross-sectional views schematically illustrating display devices for preventing reflection of light between pinhole array mask layers according to an exemplary embodiment of the present invention.

First, referring to FIG. 16A, an anti-reflection layer 600 is disposed between the pinhole array mask layer 400 and the display layer of the display panel 100. The anti-reflection layer 600 transmits most of the light that has passed through the display layer and blocks at least a part of the light that has reflected from the pinhole array mask layer 400. In addition, the anti-reflection layer 600 may also block at least a part of the light that has passed through the anti-reflection layer 600 and that was reflected from the display layer.

In an exemplary embodiment of the present invention, the anti-reflection layer 600 is a polarizing layer that blocks the reflected light. In an exemplary embodiment of the present invention, the polarizing layer may include a retardation layer (e.g., a phase delay layer) and the retardation layer may be a quarter retardation layer.

In an exemplary embodiment of the present invention, the anti-reflection layer 600 is a matte treated film. Examples of the matte treatment may include a plasma treatment, a physical treatment such as sandblasting, a chemical treatment, or the like. For example, the matte treatment may adopt a vacuum etching method, a surface buff polishing method or a sandpaper polishing method, a method of forming a black complex by a chemical agent, or the like.

Next, referring to FIG. 16B, the anti-reflection layer 600 is formed on a back surface 301 of the display layer of the display panel 100. For example, the back surface 301 of the first substrate 110 or the protective film 300 may be matte-treated. Accordingly, at least a part of the light reflected from the pinhole array mask layer 400 is not reflected once again from the back surface 301 of the display layer. The matte treatment method is as described above.

Next, referring to FIG. 16C, the anti-reflection layer 600 is formed on an upper surface 410 of the pinhole array mask layer 400. For example, the upper surface 410 of the pinhole array mask layer 400 may be matte-treated. Accordingly, at least a part of the light incident to the upper surface 410 of the pinhole array mask layer 400 is not reflected. The matte treatment method is as described above.

In view of the above, the light may be repeatedly reflected between the upper surface 410 of the pinhole array mask layer 400 and the lower surface 301 of the display layer of the display panel 100 to pass through an adjacent pinhole PH, and thereby the quality of the image captured by the optical image sensor 200 may be degraded.

However, according to the present embodiment, the light that is repeatedly reflected between the upper surface 410 of the pinhole array mask layer 400 and the lower surface 301 of the display layer of the display panel 100 and passes through an adjacent pinhole PH may be reduced, and thereby the quality of the image captured by the optical image sensor 200 may be improved.

Figure 17A:
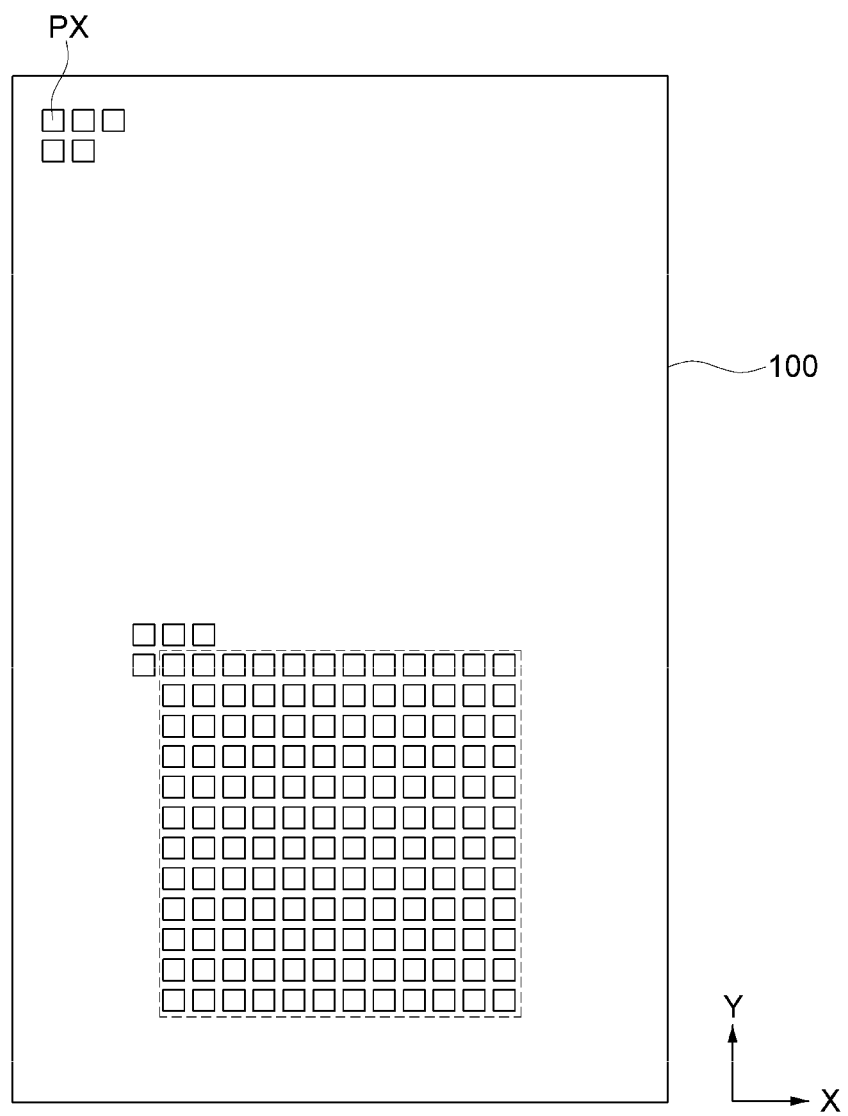
FIGS. 17A, 17B, and 17C are plan views illustrating the arrangement of pixels of a display layer of the display panel, pinholes of the pinhole array mask layer, and sensing elements of the optical image sensor, respectively, according to exemplary embodiments of the present invention.
Figure 17B:
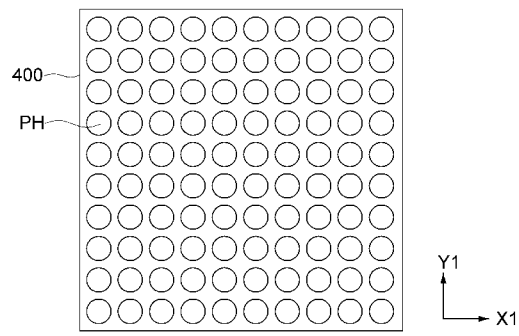
Figure 17C:
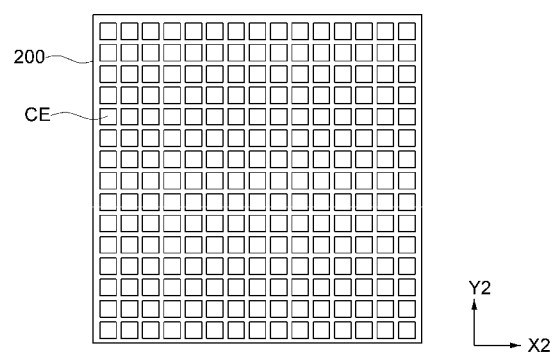

FIGS. 17A, 17B, and 17C are plan views illustrating the arrangement of pixels of a display layer of the display panel 100, pinholes PH of the pinhole array mask layer 400, and sensing elements CE of the optical image sensor 200, respectively, according to exemplary embodiments of the present invention.

Each of the pixels PX of the display layer of the display panel 100, the pinholes PH of the pinhole array mask layer 400, and the sensing elements CE of the optical image sensor 200 has a pattern repeated in at least one direction. For example, when the pixels PX are regularly arranged in the horizontal, vertical and diagonal directions, the direction of the pattern of the pixel PX may be the direction in which the distance between adjacent pixels PX is the shortest. In other words, when the distance between the pixels PX in the horizontal direction is the shortest, the pattern has a horizontal direction.

In an exemplary embodiment of the present invention, the pattern direction of the pixels PX and the pattern direction of the pinholes PH may be different from each other. In other words, the pattern of the pixels PX and the pattern of the pinholes PH are not parallel to each other. In addition, in an exemplary embodiment of the present invention, the pattern of the sensing elements CE and the pattern of the pinholes PH are not parallel to each other. In addition, in an exemplary embodiment of the present invention, all of the pattern of the sensing elements CE, the pattern of the pinholes PH, and the pattern of the pixels PX may not be parallel to each other.

Referring to FIG. 17A, the pixels PX of the display layer of the display panel 100 have a matrix shape or a lattice shape, and have rows in an X-axis direction and columns in a Y-axis direction. Referring to FIG. 17B, the pinholes PH of the pinhole array mask layer 400 also have a matrix shape or a lattice shape, and have rows in an X1-axis direction and columns in a Y1-axis direction. Referring to FIG. 17C, the sensing elements CE of the optical image sensor 200 have a matrix shape or a lattice shape, and have rows in an X2-axis direction and columns in a Y2-axis direction.

In an exemplary embodiment of the present invention, the X1 axis and the X2 axis are not parallel to each other. In other words, the row of the pinhole PH and the row of the sensing element CE are not parallel to each other. Further, the X axis may not be parallel to the X1 axis and/or the X2 axis.

In an exemplary embodiment of the present invention, each row and column are perpendicular to each other. Alternatively, each row and column may not be perpendicular to each other, and the angle between each row and column may be different from each other. In addition, in an exemplary embodiment of the present invention, the pixel PX, the pinhole PH, and the sensing element CE may have different resolutions (e.g., the number per unit distance may be different from each other).

FIGS. 18A to 18E are images captured by different display devices having different angles between an arrangement direction of the pinholes PH of the pinhole array mask layer 400 and an arrangement direction of the sensing elements CE of the optical image sensor 200, according to exemplary embodiments of the present invention.

FIGS. 18A to 18E show images that are captured as an angle between the arrangement direction (or pattern direction) of the pinholes PH and the arrangement direction (or pattern direction) of the sensing elements CE, in other words, the angle between the X1 axis and the X2 axis (or the angle between the Y1 axis and the Y2 axis) is increased each time by about 15 degrees.

As shown in FIGS. 18A to 18E, moirés occur in the captured image due to the difference in resolution and/or pattern direction between the pinhole PH and the sensing element CE. In addition, FIGS. 18A and 18D (or FIGS. 18B and 18E) which have an angle difference of about 45 degrees show moirés that have a similar shape and are only different in direction.

Figure 18A:
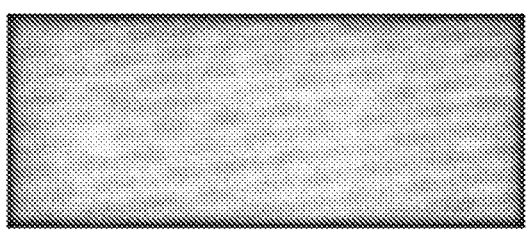
FIGS. 18A, 18B, 18C, 18D and 18E are images captured by different display devices having different angles between an arrangement direction of the pinholes of the pinhole array mask layer and an arrangement direction of the sensing elements of the optical image sensor, according to exemplary embodiments of the present invention.
Figure 18B:
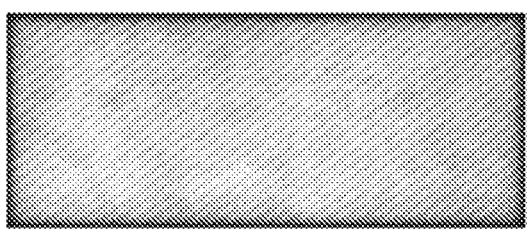
Figure 18C:
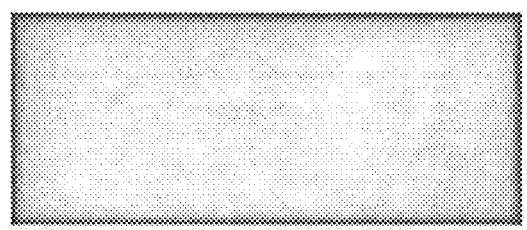
Figure 18D:
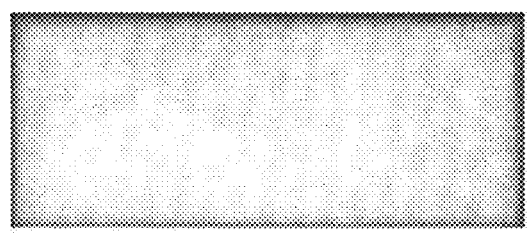
Figure 18E:
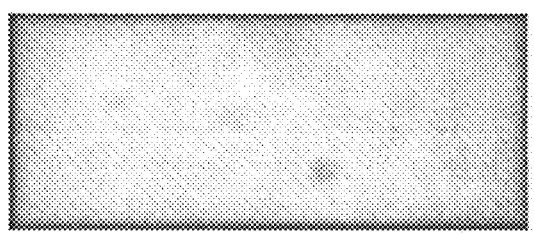

FIG. 18C hardly shows any moiré.

Figure 19A:
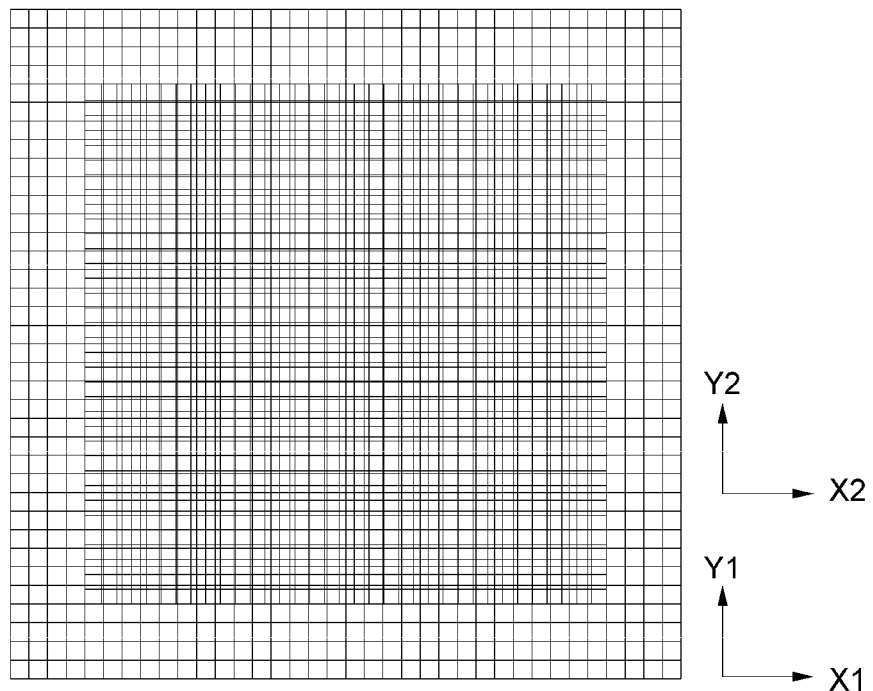
FIGS. 19A-19B and 19C show moirés that occur in accordance with a change in angle between two arrays, according to exemplary embodiments of the present invention.
Figure 19B:
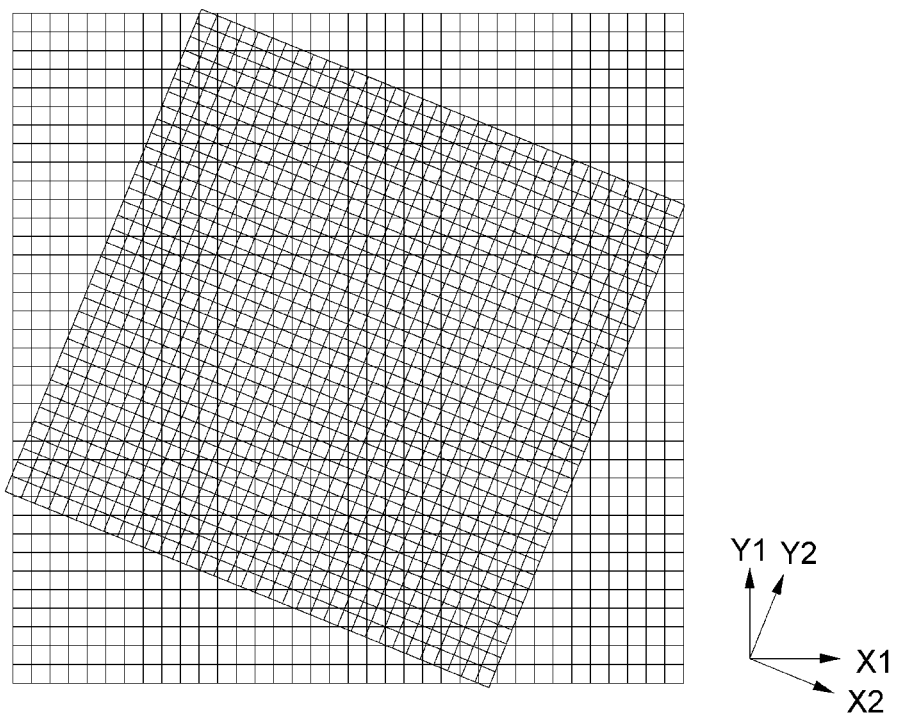
Figure 19C:
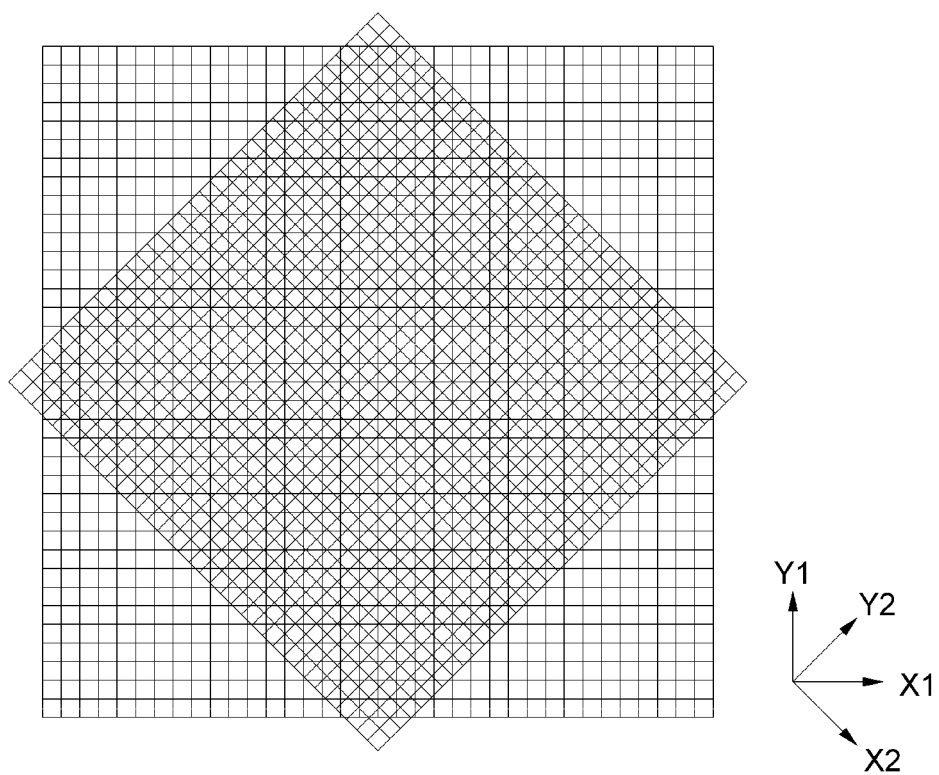

FIGS. 19A to 19C show moirés that occur in accordance with a change in angle between two arrays, according to exemplary embodiments of the present invention.

FIG. 19A shows the case where the pattern directions X1 and X2, in other words, each row, of the pinholes PH and the sensing elements CE are parallel to each other. FIG. 19B shows the case where the pattern directions X1 and X2, in other words, each row, of the pinholes PH and the sensing elements CE have an angle difference of about 225 degrees. FIG. 19C shows the case where the angle difference is about 45 degrees. FIGS. 19A and 19C show moirés that occur regularly, but FIG. 19B does not show moirés.

Thus, according to an exemplary embodiment of the present invention, an angle between the row of the pinholes PH and the row of sensing elements CE is greater than about 0 degree and less than about 45 degrees. For example, the angle between the row of the pinhole PH and the row of the sensing element CE may be in a range from about 15 degrees to about 30 degrees. However, exemplary embodiments are not limited thereto, and the angle between the row of the pinholes PH and the row of sensing elements CE may be determined according to the resolution of the pinhole PH and the sensing device CE in the row and column directions, and the angle of the pinhole PH and the sensing device CE in the row and column directions.

Figure 20A:
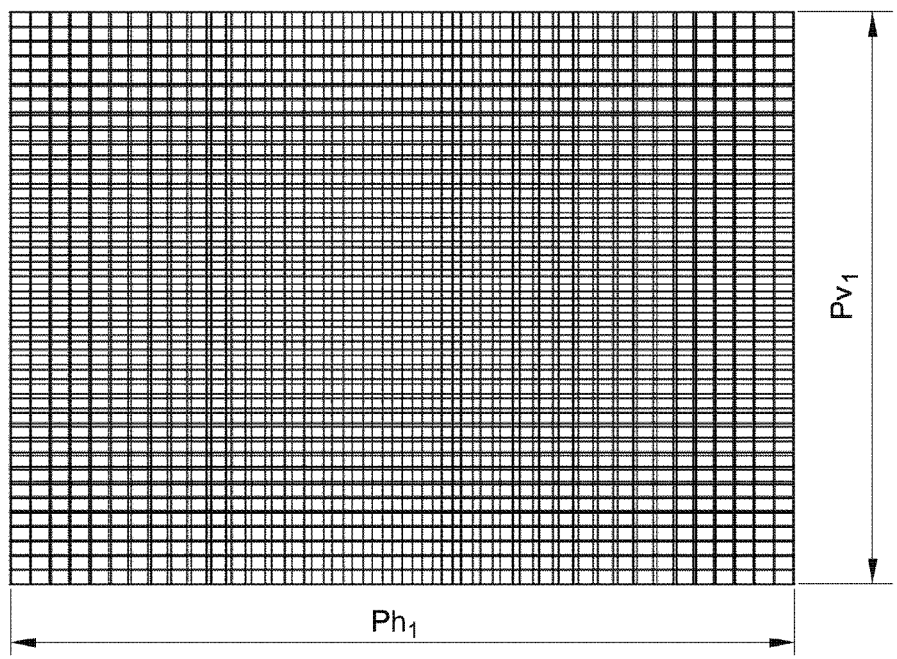
FIGS. 20A and 20B show moirés generated according to the resolution of two arrays, according to exemplary embodiments of the present invention.
Figure 20B:
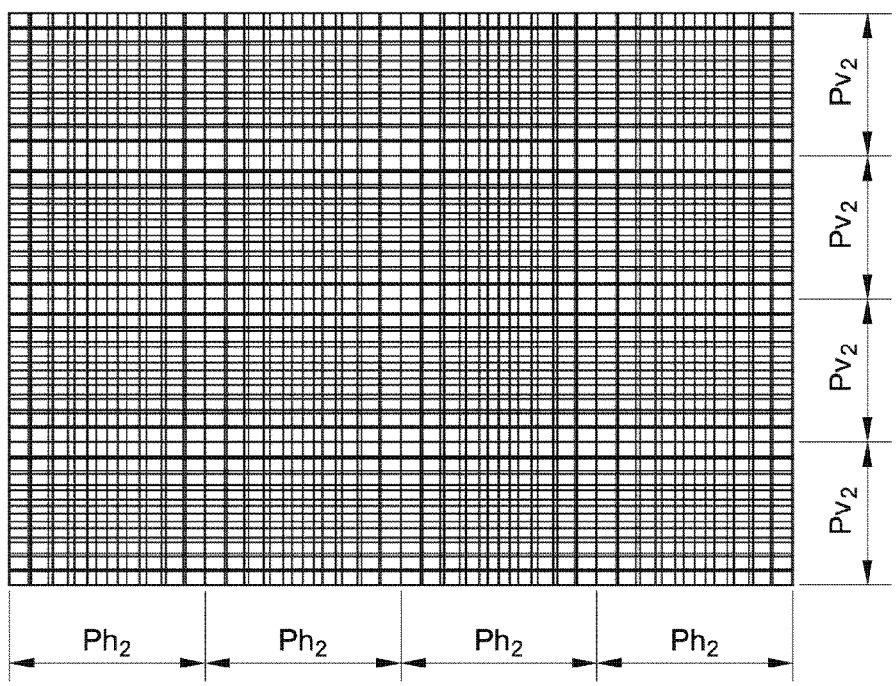

FIGS. 20A and 20B show moirés generated according to the resolution of two arrays, according to exemplary embodiments of the present invention.

FIG. 20A shows that a lattice having 40 cells per predetermined length Ph1 in the horizontal direction and having 40 cells per predetermined length Pv1 in the vertical direction is superimposed with a lattice having 39 cells per predetermined length Ph1 in the horizontal direction and having 39 cells per predetermined length Pv1 in the vertical direction. FIG. 20B shows that a lattice having 5 cells per predetermined length Ph2 in the horizontal direction and having 5 cells per predetermined length Pv2 in the vertical direction is superimposed with a lattice having 4 cells per predetermined length Ph2 in the horizontal direction and having 4 cells per predetermined length Pv2 in the vertical direction. The entire lattice corresponds to an optical image sensor 200 or a fingerprint recognition area (510 and 520). FIG. 20A shows no repeated moiré, but FIG. 20B shows moiré that repeats every predetermined length Ph2 and Pv2.

According to an exemplary embodiment of the present invention, "n" (e.g., 40) number of sensing elements CE are arranged per predetermined length in one direction (e.g., in the column or row direction), "m" (e.g., 39) number of pinholes PH are arranged per the same length in substantially the same direction. Here, n and m are natural numbers that are prime to each other. In other words, the predetermined lengths (e.g., Ph1 and Pv1) may be the least common multiple of the distance (e.g., pitch) between the pinholes PH and the distance (e.g., pitch) between the sensing elements CE. The predetermined lengths (e.g., Ph1 and Pv1), in other words, the least common multiple of the distance (e.g., pitch) between the pinholes PH and the distance (e.g., pitch) between the sensing elements CE, may be substantially equal to or greater than the length of the optical image sensor 200 or the length of the fingerprint recognition area (510 and 520) in that direction. For example, the predetermined length (e.g., Ph1 or Pv1) is two times or more than the length of the optical image sensor 200.

Accordingly, in the present embodiment, moiré that may be generated due to the resolution difference between the sensing element CE and the pinhole PH may be reduced. In addition, the present embodiment may be applied to the resolutions of the pinhole PH and the pixel PX.

As set forth hereinabove, according to exemplary embodiments of the present invention, the display device may acquire higher resolution fingerprint images when, for example, a display area and a fingerprint recognition area overlap each other.

While the present invention has been illustrated and described with reference to exemplary embodiments thereof, it will be apparent to those of ordinary skill in the art that various changes in form and detail may be made thereto without departing from the spirit and scope of the present invention as defined by the following claims.

What is claimed is:

1. A display device, comprising:
   a controller;
   an optical image sensor;
   a pinhole array mask layer on the optical image sensor, wherein a distance between two pinholes of the pinhole array mask layer is about 40 μm to about 127 μm;
   a display layer disposed on the pinhole array mask layer and comprising a plurality of pixels; and
   a transparent cover layer disposed on the display layer, wherein a finger placement surface is provided on the transparent cover layer,
   wherein each of the pixels is one of a red pixel, a green pixel, and a blue pixel,
   the display layer displays an image indicating a fingerprint recognition area overlapping the optical image sensor and, in response to the sensing of a finger in the fingerprint recognition area, the controller determines a first area in which a touch is input in the fingerprint recognition area and a second area in which the touch is not input in the fingerprint recognition area, and
   at least one of the green pixel and the blue pixel emits light and the red pixel does not emit light in the first area.

2. The display device of claim 1, wherein only the red pixel that is located in the first area does not emit light.

3. The display device of claim 2, wherein each of the green pixel, the blue pixel and the red pixel emits light in the second area.

4. The display device of claim 3, wherein the display layer further comprises a touch sensing layer for sensing a shape of the finger in contact with the finger placement surface.

5. The display device of claim 1, wherein a width of a pinhole of the pinhole array mask layer is about 20 μm to about 80 μm.

6. The display device of claim 1, wherein a width of a pinhole of the pinhole array mask layer is about 65 μm or more when a distance between the pinhole array mask layer and the optical image sensor is about 3.0 mm or more and about 4.0 mm or less, the width of the pinhole is about 45 μm to about 75 μm when the distance between the pinhole array mask layer and the optical image sensor is about 2.0 mm or more and about 3.0 mm or less, the width of the pinhole is about 25 μm to about 55 μm when the distance between the pinhole array mask layer and the optical image sensor is about 1.0 mm or more and about 2.0 mm or less, and the width of the pinhole is about 25 μm to about 55 μm when the distance between the pinhole array mask layer and the optical image sensor is about 0.5 mm or more and about 1.0 mm or less.

7. A display device, comprising:
   an optical image sensor;
   a pinhole array mask layer disposed on the optical image sensor and comprising a plurality of pinholes;
   a display layer disposed on the pinhole array mask layer and comprising a plurality of pixels; and
   a transparent cover layer disposed on the display layer and having a finger placement surface,
   wherein adjacent pinholes of the plurality of pinholes are spaced apart from each other by a distance of about 40 μm to about 127 μm.

8. The display device of claim 7, wherein the adjacent pinholes are spaced apart from each other by the distance of about 40 μm to about 85 μm.

9. The display device of claim 7, wherein the pinhole array mask layer is spaced from the optical image sensor by a distance of about 0.25 mm to about 4.0 mm.

10. The display device of claim 9, wherein a minimum value of the distance between the adjacent pinholes is about 80 μm when the distance between the pinhole array mask layer and the optical image sensor is about 3.0 mm or more and about 4.0 mm or less, the minimum value of the distance between the adjacent pinholes is about 70 μm when the distance between the pinhole array mask layer and the optical image sensor is about 2.0 mm or more and about 3.0 mm or less, the minimum value of the distance between the adjacent pinholes is about 55 μm when the distance between the pinhole array mask layer and the optical image sensor is about 1.0 mm or more and about 2.0 mm or less, the minimum value of the distance between the adjacent pinholes is about 45 μm when the distance between the pinhole array mask layer and the optical image sensor is about 0.5 mm or more and about 1.0 mm or less, and the minimum value of the distance between the adjacent pinholes is about 40 μm when the distance between the pinhole array mask layer and the optical image sensor is about 0.25 mm or more and about 0.5 mm or less.

11. The display device of claim 9, wherein the pinhole array mask layer is spaced apart from the optical image sensor by about 1 mm or less.

12. The display device of claim 9, wherein a width of a first pinhole of the plurality of pinholes is about 20 μm to about 80 μm.

13. The display device of claim 12, wherein the width of the first pinhole is about 65 μm or more when the distance between the pinhole array mask layer and the optical image sensor is about 3.0 mm or more and about 4.0 mm or less, the width of the first pinhole is about 45 μm to about 75 μm when the distance between the pinhole array mask layer and the optical image sensor is about 2.0 mm or more and about 3.0 mm or less, the width of the first pinhole is about 25 μm to about 55 μm when the distance between the pinhole array mask layer and the optical image sensor is about 1.0 mm or more and about 2.0 mm or less, and the width of the first pinhole is about 25 μm to about 55 μm when the distance between the pinhole array mask layer and the optical image sensor is about 0.5 mm or more and about 1.0 mm or less.

14. The display device of claim 7, wherein a ratio of a thickness of the pinhole array mask layer to a width of a first pinhole of the plurality of pinholes is about 5 to about 20.

15. A display device, comprising:
   an optical image sensor;
   a pinhole array mask layer on the optical image sensor;
   a display layer disposed on the pinhole array mask layer and comprising a plurality of pixels;
   a transparent cover layer disposed on the display layer and having a finger placement surface; and
   an anti-reflection layer between the display layer and the pinhole array mask layer, wherein the pinhole array mask layer and the optical image sensor are spaced apart from each other by 0.25 mm to 4.0 mm.

16. The display device of claim 15, wherein the anti-reflection layer comprises a polarizing layer.

17. The display device of claim 16, wherein the anti-reflection layer comprises a retardation layer.

18. The display device of claim 17, wherein the retardation layer is a quarter retardation layer.

19. The display device of claim 15, wherein the anti-reflection layer comprises a matte film.

20. The display device of claim 15, wherein the anti-reflection layer comprises a matte-treated surface of the display layer.

21. The display device of claim 15, wherein the anti-reflection layer comprises a matte-treated surface of the pinhole array mask layer.

22. The display device of claim 15, wherein an inner circumferential surface of a pinhole of the pinhole array mask layer is matte-treated.

23. The display device of claim 15, wherein the optical image sensor further comprises a filter for blocking red light.

24. The display device of claim 23, wherein the filter is a color filter that transmits green or blue light.

25. The display device of claim 15, wherein the optical image sensor further comprises a filter for blocking infrared rays.

26. A display device, comprising:
    an optical image sensor comprising a plurality of sensing elements having a first pattern;
    a pinhole array mask layer disposed on the optical image sensor and comprising a plurality of pinholes having a second pattern;
    a display layer disposed on the pinhole array mask layer and comprising a plurality of pixels having a third pattern; and
    a transparent cover layer disposed on the display layer and having a finger placement surface,
    wherein the first pattern and the second pattern are not parallel to each other; and
    each of the first pattern and the second pattern is in the form of a matrix having rows and columns; and
    an angle between the rows of the first pattern and the rows of the second pattern is greater than about 0 degree and less than about 45 degrees.

27. The display device of claim 26, wherein the angle between the rows of the first pattern and the rows of the second pattern is greater than about 15 degrees and less than about 30 degrees.

28. The display device of claim 26, wherein the second pattern and the third pattern are not parallel to each other.

29. The display device of claim 28, wherein the third pattern is in the form of a matrix having rows and columns, and the rows and the columns of the third pattern are not parallel to the rows and the columns of the second pattern.

30. The display device of claim 26, wherein the first pattern, the second pattern, and the third pattern are not parallel to each other.

31. A display device, comprising:
    an optical image sensor comprising a plurality of sensing elements, wherein "n" of the sensing elements are arranged per predetermined length in a first direction;
    a pinhole array mask layer disposed on the optical image sensor and comprising a plurality of pinholes, wherein "m" of the pinholes are arranged per the predetermined length in the first direction, and the m pinholes are spaced apart from each other by about 40 μm to about 127 μm;
    a display layer disposed on the pinhole array mask layer and comprising a plurality of pixels; and
    a transparent cover layer disposed on the display layer and having a finger placement surface,
    wherein n and in are natural numbers that are prime to each other, and
    the predetermined length is substantially equal to or larger than a length of the optical image sensor in the first direction.

32. The display device of claim 31, wherein the predetermined length is at least two times or more of the length of the optical image sensor in the first direction.

* * * * *